US011942069B1

(12) United States Patent
Kontomichos et al.

(10) Patent No.: US 11,942,069 B1
(45) **Date of Patent: *Mar. 26, 2024**

(54) TOOLS AND METHODS FOR DESIGNING FEEDFORWARD FILTERS FOR USE IN ACTIVE NOISE CANCELLING SYSTEMS

(71) Applicant: Dialog Semiconductor B.V., s-Hertogenbosch (NL)

(72) Inventors: Fotios Kontomichos, Patras (GR); Wessel Harm Lubberhuizen, Delden (NL); Paul Shields, Dunblane (GB)

(73) Assignee: Renesas Design Netherlands B.V., 's-Hertogenbosch (NL)

( * ) Notice: Subject to any disclaimer, the term of this patent is extended or adjusted under 35 U.S.C. 154(b) by 0 days.

This patent is subject to a terminal disclaimer.

(21) Appl. No.: 17/748,166

(22) Filed: May 19, 2022

Related U.S. Application Data

(63) Continuation of application No. 16/720,358, filed on Dec. 19, 2019, now Pat. No. 11,404,040.

(51) Int. Cl.
*G10K 11/178* (2006.01)

(52) U.S. Cl.
CPC .. *G10K 11/17854* (2018.01); *G10K 11/17881* (2018.01); *G10K 2210/1081* (2013.01); *G10K 2210/3026* (2013.01); *G10K 2210/3027* (2013.01); *G10K 2210/3028* (2013.01)

(58) Field of Classification Search
None
See application file for complete search history.

(56) References Cited

U.S. PATENT DOCUMENTS

| | | | |
|---|---|---|---|
| 5,182,774 | A | 1/1993 | Bourk |
| 5,425,105 | A | 6/1995 | Lo et al. |
| 6,278,786 | B1 | 8/2001 | McIntosh |
| 8,798,283 | B2 | 8/2014 | Gauger, Jr. et al. |
| 9,437,182 | B2 | 9/2016 | Doclo |
| 9,837,066 | B2 | 12/2017 | Wurtz |
| 10,034,092 | B1 | 7/2018 | Nawfal et al. |
| 10,950,213 | B1 | 3/2021 | Lu |
| 11,189,261 | B1 | 11/2021 | Lu |

(Continued)

OTHER PUBLICATIONS

"Adapting Hearing Devices to the Individual Ear Acoustics: Database and Target Response Correction Functions for Various Device Styles," by Florian Denk et al., Trends in Hearing, vol. 22, pp. 1-19, Copyright: The Author(s) 2018, DOI: 10 1177/2331216518779313, journals.sagepub.com/home/tia, SAGE, Nov. 24, 2017.

(Continued)

*Primary Examiner* — Qin Zhu
(74) *Attorney, Agent, or Firm* — Saile Ackerman LLC; Stephen B. Ackerman

(57) ABSTRACT

A method of automated feedforward filter design comprising designing a feedforward filter for a system implementing active noise cancelling is described. The method includes designing the feedforward filter by determining a filter transfer function of the feedforward filter. The filter transfer function is determined using a least square method. The method also includes determining the filter transfer function by defining a target transfer function of the feedforward filter and applying the least square method using the target transfer function to determine a filter expression for the filter transfer function. The least square method is a weighted least square method.

13 Claims, 14 Drawing Sheets

(56) References Cited

U.S. PATENT DOCUMENTS

| | | | |
|---|---|---|---|
| 2004/0264706 A1 | 12/2004 | Ray |
| 2010/0002889 A1 | 1/2010 | Jorgensen |
| 2010/0166206 A1 | 7/2010 | Macours |
| 2011/0007907 A1 | 1/2011 | Park |
| 2012/0170766 A1 | 7/2012 | Alves |
| 2012/0250873 A1 | 10/2012 | Bakalos |
| 2014/0126734 A1 | 5/2014 | Gauger |
| 2014/0314245 A1 | 10/2014 | Asada |
| 2016/0300563 A1 | 10/2016 | Park |
| 2017/0125006 A1 | 5/2017 | Dzhigan |
| 2021/0082387 A1 | 3/2021 | Ku |
| 2022/0322002 A1 | 10/2022 | O'Connell et al. |

OTHER PUBLICATIONS

"Equalization filter design for achieving acoustic transparency in a semi-open fit hearing device," by Florian Denk et al., ITG-Gachbericht 282: Speech Communication, Oct. 10-12, 2018, pp. 226-230, Copyright: VDS Verlag GMBH—Berlin, ISBN 978-3-8007-4767-2.

"Analog and Digital State-Space Adaptive IIR Filters," by David A. Johns, Thesis submitted to the Department of Electrical Engineering, University of Toronto, Mar. 1989, 153 pages.

"Algorithms for the Constrained Design of Digital Filters with Arbitrary Magnitude and Phase Responses," Dissertation, Jun. 1999, 232 pages, @inproceedings{Lang1999AlgorithmsFT, title={Algorithms for the Constrained Design of Digital Filters with Arbitrary Magnitude and Phase Respo}, author={Markus Lang}, yea.

"Optimal Feedback Control Formulation of the Active Noise Cancellation Problem: Pointwise and Distributed," by Kambiz C. Zangi, Research Laboratory of Electronics Technical Report No. 583, MIT, Cambridge, Massachusetts, May 1994, 158 pages.

"Optimal Design of Digital IIR Filters by Model-Fitting Frequency Response Data," by Arnab K. Shaw, IEEE Transactions on Circuits and Systems-II: Analog and Digital Signal Processing, vol. 42, No. 11, Nov. 1995, pp. 702-710.

"Adaptive Feedback Active Noise Control Headset: Implementation, Evaluation and Its Extension," by Woon S. Gan et al., IEEE Transactions on Consumer Electronics (vol. 51, Issue: 3, Aug. 2005), pp. 975-982.

"Frequency Warping, Basic Concepts, Operators and Transforms" by Unto K. Laine, Found: users.spa.aalto.fi/unski/FreqW.html, pp. 1-4, Frequency_Warping.html, Dec. 12, 2019.

"Direct Design of Parallel Second-Order Filters for Instrument Body Modeling," by Balazs Bank, International Computer Music Conference, Proceedings vol. 1, pp. 458-465, Copenhagen, Denmark, Aug. 2007.

H2/H∞ Active Control of Sound in a Headrest: Design and Implementation, by Boaz Rafaely et al., IEEE Transaction on Control Systems Technology, vol. 7, No. 1, Jan. 1999, pp. 79-84.

"Improved Pole Positioning for Parallel Filters Based on Spectral Smoothing and Multi-Band Warping," by Balazs Bank et al., IEEE Signal Processing Letters, vol. 18, No. 5, May 2011, pp. 299-302.

"On H∞-Optimal Sensitivity Theory for SISO Feedback Systems," by Bruce A Francis et al., IEEE Transactions on Automatic Control, vol. AC-29, No. 1, Jan. 1984, pp. 9-16.

"Perceptually Motivated Audio Equalization Using Fixed-Pole Parallel Second-Order Filters," by Balazs Bank, IEEE Signal Processing Letters, vol. 15, May 23, 2008, pp. 477-480.

"Loudspeaker and Room Response Equalization Using Parallel Filters: Comparison of Pole Positioning Strategies," by Balazs Bank, AES 51st International Conference: Loudspeakers and Headphones, Helsinki, Finland, Aug. 22-24, 2013, pp. 1-10.

"Frequency-Domain Steiglitz-McBride Method for Least-Squares IIR Filter Desig, ARMA Modeling, and Periodogram Smoothing," by Leland B. Jackson, IEEE Signal Processing Letters, vol. 15, Jan. 4, 2008, pp. 49-52.

"Frequency-Warped Signal Processing for Audio Applications," by Aki Harma et al., Journal of Audio Engineering Society, vol. 48, No. 11, Nov. 2000, pp. 1011-1031.

"Measuring Short Impulse Responses With Inverse Filtered Maximum-Length Sequences," by Pedro Cobo et al., Elsevier, Applied Acoustics, vol. 68, Issue 7, Jul. 2007, pp. 820-830.

U.S. Office Action, U.S. Appl. No. 16/720,358, Applicant: Kontomichos et al., dated Aug. 27, 2020, 16 pages.

U.S. Notice of Allowance, U.S. Appl. No. 16/720,358, Applicant: Kontomichos et al., dated Mar. 14, 2022, 7 pages.

U.S. Office Action, U.S. Appl. No. 16/720,358, Applicant: Kontomichos et al., dated Dec. 15, 2020, 13 pages.

U.S. Office Action, U.S. Appl. No. 16/720,358, Applicant: Kontomichos et al., dated Apr. 16, 2021, 13 pages.

U.S. Office Action, U.S. Appl. No. 16/720,358, Applicant: Kontomichos et al., dated Jul. 22, 2021, 18 pages.

Autodesk, "library.io". https://web.archive.org/web/20181231233511/https://library.io/. Dec. 31, 2018. (Year: 2018).

Matlab, "Designing Digital Filters with Matlab." https://www/youtube.com/watch?v=VFt3UVw7VrE. Mar. 6, 2018. (Year 2018).

Chen et al, "Design of an Efficient Active Noise Cancellation Circuit for In-ear Headphones." pp. 1-5. Feb. 2015 (Year: 2015).

Lohn et al, "A Circuit Representation Technique for Automated Circuit Design." pp. 1-15. Sep. 1999, (Year: 1999).

Rojec et al, "An Evolution-Driven Analog Circuit Topology Synthesis". pp. 1-6. 2016. (Year: 2016).

"Stability Criteria—(Gain Margin and Phase Margin)", published Sep. 2000, gonzo@mit.edu, 4 pages, URL: https://www.mit.edu/afs.new/athena/course/2/2.010/www_f00/psets/hw3_dir/tutor3_dir/tut3_g.html.

U.S. Office Action, U.S. Appl. No. 17/334,167, Applicant: Kontomichos et al., filed May 28, 2021, 23 pages.

U.S. Notice of Allowance, U.S. Appl. No. 17/334,167, Applicant: Kontomichos et al., dated Feb. 8, 2023, 17 pages.

"Control Tutorials for MATLAB and Simulink—Introduction: Frequency Domain Methods for Controller Design", webpage accessed Nov. 18, 2022, https://ctms.engin.umich.edu/CTMS/index.php/Content/Suspension/Simulink/Modeling/Content/Animations/bbgui.fig?example=Introduction&section=ControlFrequency, pp. 1-13.

TOOLS AND METHODS FOR DESIGNING FEEDFORWARD FILTERS FOR USE IN ACTIVE NOISE CANCELLING SYSTEMS

This application is a Continuation application (DS19-037G_CON) of application Ser. No. 16/720,358, filed on Dec. 19, 2019, owned by a common assignee, and which is herein incorporated by reference in its entirety.

TECHNICAL FIELD

The present disclosure relates to tools and methods for automated feedforward filter design. In particular, the present disclosure relates to automated feedforward filter design for designing a feedforward filter for use in a system implementing active noise cancelling.

BACKGROUND

Active Noise Cancellation (ANC) enables cancellation of unwanted acoustic noise and creates a quiet ambient environment for listeners, whilst optionally leaving desired music/audio signals to be heard without degradation. ANC is achieved by producing audio signals with equal amplitudes but opposite phases to the ambient noises at a listener's ears, thus utilizing the principle of destructive wave interference to cancel unwanted extraneous noise. A typical application of ANC is in noise cancelling headphones, where the headphone types can be distinguished by the type of fitting on the listener's ear: in-ear, on-ear and over-ear.

The two most prevalent types of ANC are feedforward (FF) ANC and feedback (FB) ANC. In an FF ANC system, microphones are situated externally on the headset to capture ambient noises before they permeate through the headset to eardrums. In a FB ANC system, microphones are placed inside the headset and in close proximity to the speaker drivers to capture soundwaves close to eardrums. The FF ANC and FB ANC systems may be combined to produce a hybrid ANC system that has superior overall performance to either of the FB ANC or the FF ANC systems used individually. In summary, hybrid ANC headsets comprise two mics in order to achieve ANC operation, namely: FF and FB.

An FF ANC system includes a feedforward (FF) filter and an FB ANC system includes a feedback (FB) filter to ensure that the respective systems provide the required noise cancellation functionality.

FIG. 1A is a schematic of a hybrid ANC headset 100. The ANC headset 100 comprises a feedforward microphone 102, a feedback microphone 104 and a speaker driver 106, in addition to a summing circuit 112. In operation an ambient noise source 108 provides ambient noise that is detected by a user's ear 110. The speaker driver 106 generates the appropriate signal at its output to cancel the ambient noise received at the user's ear 110, such that reduced ambient noise is heard by the user. $H_{AFF}$, $H_{FF}$, $H_{FB}$, $H_{DFB}$, $H_{DE}$ and $H_{AE}$ are transfer functions that are representative of the gain and phase characteristics of their respective signal paths.

FIG. 1B is an alternative schematic of the hybrid ANC headset 100 of FIG. 1A, illustrating 115, where an $H_{AFB}$ transfer function is now between the ambient noise source 108 and the feedback microphone 104.

The design of such FF and FB filters involves an engineer using specialised software to attempt to determine a suitable filter configuration. The specialised software illustrates the transfer function of a "target" filter and the transfer function of a designed filter, in addition to the overall transfer function of the ANC system implementing the filter. The transfer function of a system describes the gain and phase characteristics of a system as it varies with frequency. The transfer function may be referred to as the frequency response comprising the gain and phase information of the system.

It will be appreciated that the "gain" of a transfer function may alternatively be referred to as a "magnitude" of the transfer function.

In the present disclosure the transfer function may refer to the impulse response measurement of the system expressed in the frequency domain.

The engineer will configure the designed filter with the aim of matching the transfer function of the target filter by configuring a sequence of second order filter stages via selecting filter types (e.g. low pass, notch etc.) and defining their parameters such as cut-off frequency, quality factor etc., so that the desired total transfer function is achieved.

This procedure is followed for the FF filter and FB filter. Additionally, an appropriate equalization filter must be designed to compensate for the transfer function alteration that the FB loop is causing to the audio playback.

Manually designing FF, FB and MusicEQ filters has the following disadvantages:

1. Optimal filter design is not guaranteed, and performance is very sensitive to subjective judgement and limited to available filter types and total filter order.
2. Filter design requires an experienced engineer or comprehensive training programming. The learning curve is steep.
3. The procedure of designing a filter is non-intuitive and complex to the user and is mainly based on trial and error.
4. Filter design is a length process and typically requires 2-3 working days of an experienced engineer.
5. Multiple filter designs are typically required.

SUMMARY

It is desirable to provide an improved method for designing feedforward filters for use in active noise cancelling systems.

According to a first aspect of the disclosure there is provided a method of automated feedforward filter design comprising designing a feedforward filter for a system implementing active noise cancelling.

Optionally, designing the feedforward filter comprises determining a filter transfer function of the feedforward filter.

Optionally, the filter transfer function is determined using a least square method.

Optionally, determining the filter transfer function comprises defining a target transfer function of the feedforward filter, and applying the least square method using the target transfer function to determine a filter expression for the filter transfer function.

Optionally, the least square method is a weighted least square method.

Optionally, determining the filter transfer function comprises defining an error function that is dependent on the target transfer function and the filter transfer function, and applying the least square method using the error function to determine the filter expression for the filter transfer function that either i) reduces the error function to a sufficiently small value that is indicative of the filter transfer function being sufficiently close to the target transfer function, and/or ii) minimizes the error function.

Optionally, the error function is dependent on the difference between the target transfer function and the filter transfer function.

Optionally, the least square method is a weighted least square method such that the error function is dependent on a weighting vector.

Optionally, the error function is approximately equal to the magnitude squared of a first expression, the first expression being equal to the square root of the weighting vector multiplied by the difference between the filter transfer function and the target transfer function.

Optionally, the weighting vector is multiplied by a weighting factor.

Optionally, the method comprises a) updating the weighting factor thereby updating the error function, b) applying the least squares method using the error function to determine an alternative expression for the filter transfer function that either i) reduces the error function to a sufficiently small value that is indicative of the filter transfer function being sufficiently close to the target transfer function, and/or ii) minimizes the error function, c) updating the filter expression to the alternative expression if the error function after updating is smaller than the error function prior to updating, and d) repeating the steps a) to c) until a number of repetitions of the steps a) to c) exceed a limit, and/or the error function is less than a threshold value.

Optionally, the weighting vector is multiplied by the weighting factor in a frequency range having a minimum frequency and a maximum frequency.

Optionally, the weighting vector is approximately equal to one divided by the magnitude of the target transfer function squared.

Optionally, defining the target transfer function comprises i) modelling an active noise cancelling headset comprising a first signal path from an ambient noise source to a user's ear, a second signal path from the ambient noise source to a feedforward microphone, a third signal path from the feedforward microphone to a speaker driver, and a fourth signal path from the speaker driver to the user's ear ii) determining a transfer function of each of the first, second and fourth signal paths, wherein the transfer function of a signal path represents a gain and a phase change of the signal path, iii) defining the target transfer function as the negative of the transfer function of the first signal path, divided by the dot product of the transfer function of the second and fourth signal paths.

Optionally, the transfer function of the third signal path is the filter transfer function to be determined.

Optionally, determining the transfer function of each of the first, second and fourth signal paths, comprises measuring the transfer functions and/or by deriving simulation results.

Optionally, the feedforward filter is designed within a frequency range having a maximum frequency and a minimum frequency.

Optionally, the target transfer function comprises a gain that is dependent on frequency and applying the least square method comprises prioritizing reduction or minimization of the error function for frequencies where the gain exceeds an upper limit.

Optionally, determining the filter transfer function comprises defining a target transfer function of the feedforward filter, determining a filter expression for the filter transfer function comprising determining a first filter expression, the first filter expression comprising a first numerator polynomial and a first denominator polynomial, and determining the first filter expression by applying the least square method using the target transfer function to determine the roots of the first denominator polynomial.

Optionally, determination of the roots of the first denominator polynomial is performed in a warped frequency domain.

Optionally, determining the first filter expression comprises applying the least square method using the target transfer function to determine the roots of the first numerator polynomial after the roots of the first denominator polynomial have been determined.

Optionally, the first filter expression is updated using the roots of the first denominator polynomial prior to determination of the roots of the first numerator polynomial.

Optionally, determining the filter expression comprises determining a second filter expression, the second filter expression comprising a second numerator polynomial and a second denominator polynomial, the roots of the second denominator polynomial being equal to the roots of the first numerator polynomial, and determining the second filter expression by applying the least square method using the target transfer function to determine the roots of the second numerator polynomial.

Optionally, determining the filter expression comprises evaluating which of the first filter expression and the inverse of the second filter expression best meets a design specification, setting the filter expression as the one of the first filter expression and the inverse of the second filter expression that best meet the design specification.

Optionally, the at least one design specification comprises one or more of adaptive noise cancelling performance, attenuation gain, and/or overshoot characteristics.

According to a second aspect of the disclosure there is provided a computer system comprising a module configured as an automated feedforward filter design tool configured to design a feedforward filter for a system implementing active noise cancelling.

It will be appreciated that the computer system of the second aspect may include features set out in the first aspect and can incorporate other features as described herein.

According to a third aspect of the disclosure there is provided an apparatus comprising a feedforward filter for a system implementing active noise cancelling, the feedforward filter being designed using a method of automated feedforward filter design, the method comprising designing the feedforward filter.

Optionally, the apparatus comprises an active noise cancelling system comprising the feedforward filter, such that the active noise cancelling system is configured to provide feedforward active noise cancelling.

It will be appreciated that the apparatus of the third aspect may include features set out in the first aspect and can incorporate other features as described herein.

According to a fourth aspect of the disclosure there is provided a headphone or a headset comprising a feedforward filter for a system implementing active noise cancelling, the feedforward filter being designed using a method of automated feedforward filter design, the method comprising designing the feedforward filter.

It will be appreciated that the headphone or the headset of the fourth aspect may include features set out in the first aspect and can incorporate other features as described herein.

BRIEF DESCRIPTION OF THE DRAWINGS

The disclosure is described in further detail below by way of example and with reference to the accompanying drawings in which.

DETAILED DESCRIPTION

The design of an FF ANC headset typically includes the following steps:

1. Design and fabricate a headphone enclosure that will facilitate ANC operation.
2. Conduct specific acoustical measurements in order to define the appropriate system transfer functions.
3. Use the measurements of step 2 in order to design a suitable FF filter for achieving the desired ANC performance.
4. Confirm ANC performance after applying the designed filters on the device, with acoustical measurements.

In the present disclosure, the terms headphone and headset may be used interchangeably. It will be clear to the skilled person that the present disclosure may be applied to automated filter design for either headphones or headsets.

The present disclosure relates to methods and apparatus for designing a suitable FF filter for achieving the desired ANC performance, as seen for example at step 3 in the above design process. FIG. 2A is a flow chart of a method 200 of automated feedforward filter design comprising designing a feedforward filter for a system implementing ANC at a step 202, in accordance with a first embodiment of the present disclosure.

Designing the feedforward filter may comprise determining a filter transfer function $H_{FF}$ of the feedforward filter at a step 204. The filter transfer function $H_{FF}$ may be determined using a least square method. The feedforward filter may be designed within a frequency range having a maximum frequency and a minimum frequency. This frequency range (in Hz) may be the frequency range over which ANC is desirable. The least square method may be referred to as the least square approximation.

The method 200 describes an algorithmic sequence for calculating the infinite impulse response (IIR) transfer function of the filter transfer function $H_{FF}$.

Figure 2B:
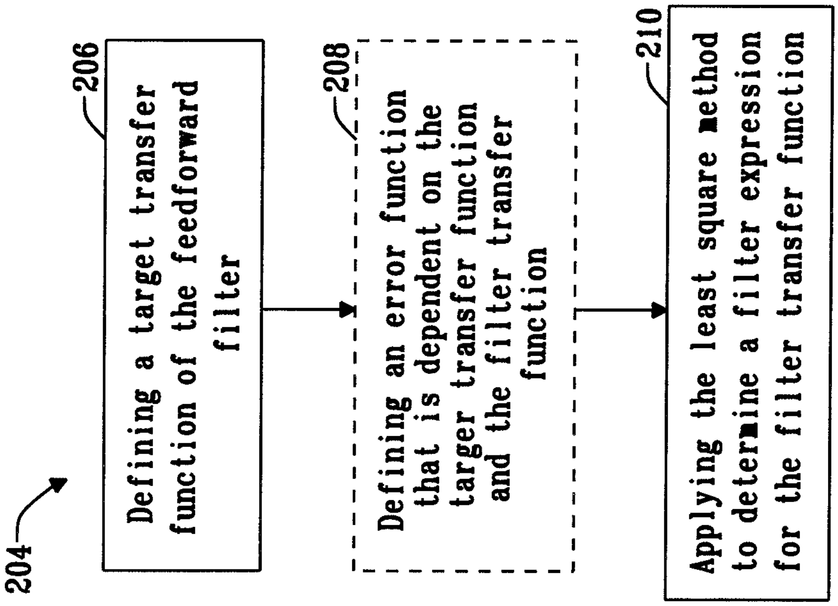
FIG. 2B is a flow chart of a specific implementation of a step of the method shown in FIG. 2A in accordance with a second embodiment of the present disclosure.
Figure 2A:
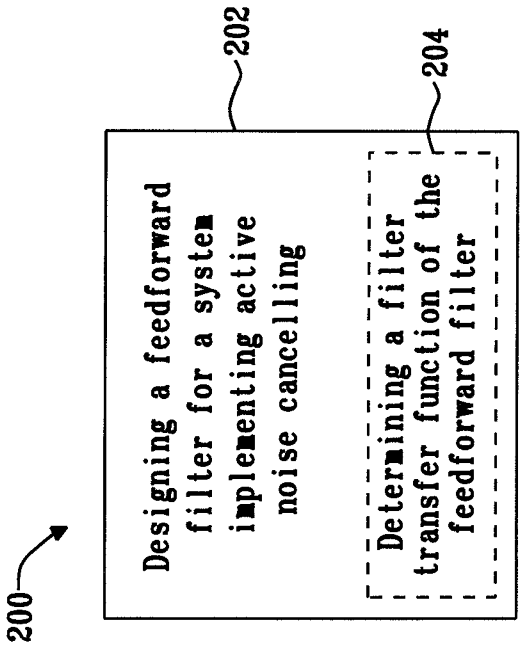
FIG. 2A is a flow chart of a method of automated feedforward filter design in accordance with a first embodiment of the present disclosure.

FIG. 2B is a flow chart of a specific implementation of the step 204 of the method 200 shown in FIG. 2A in accordance with a second embodiment of the present disclosure. Determining the filter transfer function $H_{FF}$ comprises defining a target transfer function $H_T$ of the feedforward filter, at a step 206, and applying the least square method to determine a filter expression for the filter transfer function $H_{FF}$, at a step 210. The least square method may be a weighted least square method.

Determining the filter transfer function $H_{FF}$ may comprise defining an error function Err that is dependent on the target transfer function $H_T$ and the filter transfer function $H_{FF}$, at a step 208. Applying the least square method in step 210 may comprise using the error function Err to determine the filter expression for the filter transfer function $H_{FF}$ that either reduces the error function Err to a sufficiently small value that is indicative of the filter transfer function $H_{FF}$ being sufficiently close to the target transfer function $H_T$ and/or minimizes the error function Err.

The target transfer function $H_T$ represents the gain and phase characteristics of the feedforward microphone 102 in an idealized ANC system that would provide optimum noise cancellation characteristics. To provide this optimum functionality, it is necessary to determine the filter expression for the filter transfer function $H_{FF}$ that matches, or is sufficiently close to, the gain and phase change characteristics represented by the target transfer function $H_T$.

The target transfer function $H_T$ may not be a system measured response but a combination of the measured transfer functions derived for optimal FF ANC performance.

The filter expression for the filter transfer function $H_{FF}$ that is derived will be achievable using physical circuit components and parameters, such that the designed feedforward filter can be implemented using these circuit components and parameters to provide the optimal ANC functionality that is represented by the target transfer function $H_T$.

The filter expression of the filter transfer function $H_{FF}$ is a mathematical expression and may be a polynomial, where the coefficients of the filter expression can be written in corresponding registers of an integrated circuit (IC) implementing digital signal processing (DSP) for ANC. The filter expression derived for the filter transfer function $H_{FF}$ preferably minimizes the error between the filter transfer function $H_{FF}$ and the target transfer function $H_T$. The error is represented by the error function Err.

The filter expression of the filter transfer function $H_{FF}$ may be described by a fraction having a numerator polynomial and a denominator polynomial. The highest order of the two polynomials determines the filter order.

A polynomial of Nth order is determined by N+1 coefficients. For example, a 2nd order IIR filter may be expressed by the expression:

$$\frac{b_0 + b_1 z^{-1} + b_2 z^{-2}}{1 + a_1 z^{-1} + a_2 z^{-2}} \quad (1)$$

A detailed and complicated frequency response requires a very high filter order for its polynomial representation. Poles are the roots of the denominator polynomial and zeros are the roots of the numerator polynomial. Also, it is possible to calculate coefficients from given poles and vice versa from standard equations.

The error function Err is a measure of how close the filter expression for the filter transfer function $H_{FF}$ matches the target transfer function $H_T$. It is desirable for the filter transfer function $H_{FF}$ to match the target transfer function $H_T$ exactly, which would yield an error function Err equal to zero. However, in a practical implementation that uses physically implementable circuits and parameters, it is not feasible to match the filter transfer function $H_{FF}$ exactly to the target transfer function $H_T$. As such, it is desirable that the error function Err is of a sufficiently small value that is indicative of the filter transfer function $H_{FF}$ providing the necessary functionality within an application-dependent tolerance range. For example, in an ANC system, it will be less relevant to provide optimal noise cancelling outside the range of human hearing, and the system may compromise in this area. Preferably, the error function Err is minimized.

In the present embodiment the error function Err is dependent on the difference between the target transfer function and the filter transfer function, and may be expressed as follows:

$$\mathrm{Err} = |H_{FF} - H_T|^2 \quad (2)$$

In a further embodiment, the least square method may be a weighted least square method such that the error function Err is dependent on a weighting vector W, as follows:

$$\mathrm{Err} = |\sqrt{W}(H_{FF} - H_T)| \quad (3)$$

As shown in equation (3) the error function Err in the present embodiment is equal to the magnitude squared of a first expression, given by the square root of the weighting vector W, multiplied by the difference between the filter transfer function $H_{FF}$ and the target transfer function $H_T$.

The weighting vector W is preferably a vector with appropriate weight values to minimize errors between the target transfer function $H_T$ and the filter transfer function $H_{FF}$ in specific frequency ranges. For example, for high performance ANC, it may be essential that the target transfer function $H_T$ and the filter transfer function $H_{FF}$ match very closely over a first frequency range, whilst the transfer functions $H_T$, $H_{FF}$ can differ largely over a second frequency range. The weighting vector W can be used to weight the importance of the matching of the transfer functions $H_{FF}$, $H_T$ over the different frequency ranges, which can simplify and/or speed up the design process.

The weighting vector W may have two functions, namely: reducing the distance, represented by the value of the error function Err, between $H_{FF}$ and $H_T$ in the ANC range (the first frequency range) and increasing the distance elsewhere (the second frequency range). The increase in the error function Err value in the second frequency range is necessary for reducing overshoots.

The target transfer function $H_T$ that is representative of the filter transfer function $H_{FF}$ that would provide the optimum ANC performance. The target transfer function $H_T$ can be defined by modelling an ANC headset and evaluating the desired filter transfer function $H_{FF}$ in terms of the transfer functions of the remaining signal paths in the ANC system.

Figure 1A:
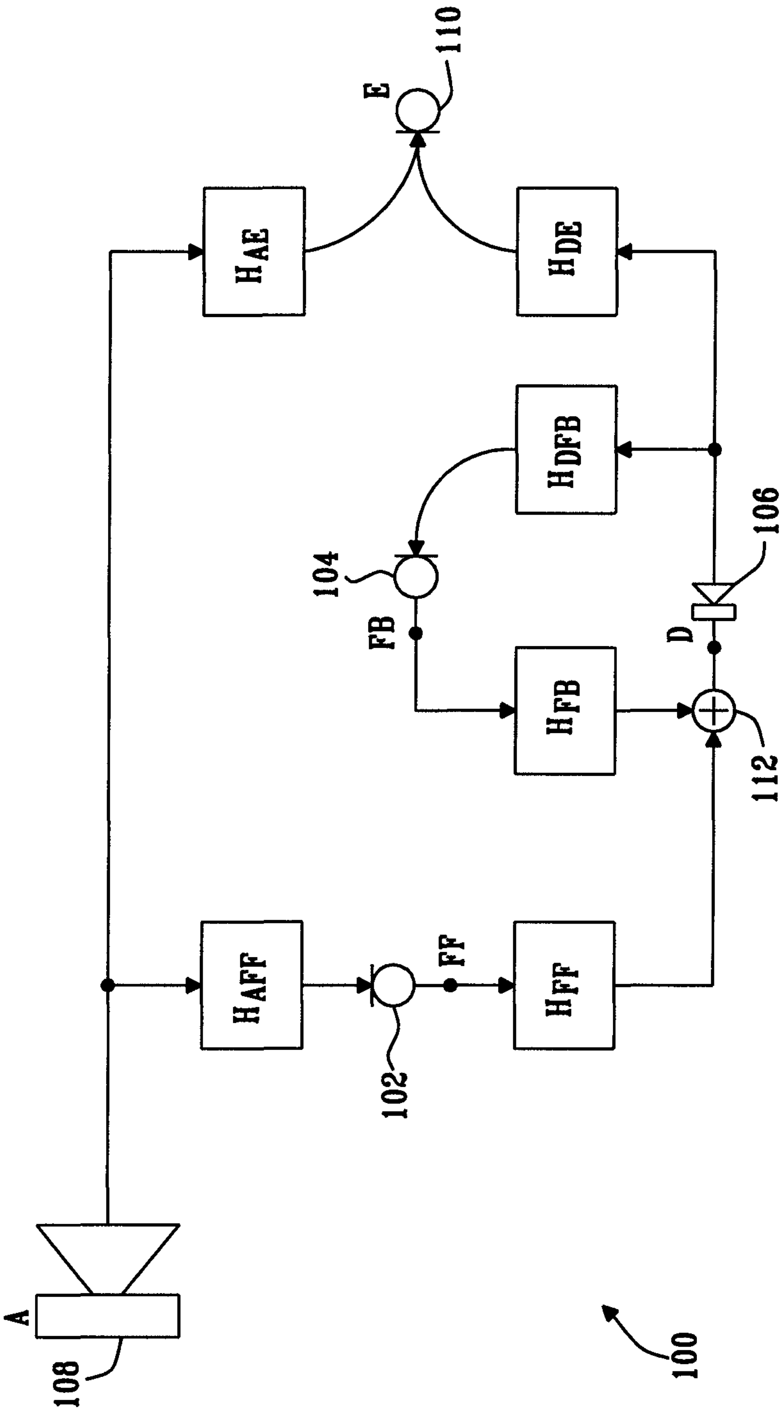
FIG. 1A Prior Art
FIG. 1A is a schematic of a hybrid active noise cancellation (ANC) headset.

For example, and with reference to the ANC headset 100 of FIG. 1A, there is a first signal path from the ambient noise source 108 to the user's ear 110. The first signal path is characterised by the transfer function $H_{AE}$. There is a second signal path from the ambient noise source 108 to the feedforward microphone 102. The second signal path is characterised by the transfer function $H_{AFF}$. The third signal path from the feedforward microphone 102 to the speaker driver 106 is characterised by the filter transfer function $H_{FF}$. The fourth signal path from the speaker driver 106 to the user's ear 110 is characterised by the transfer function $H_{DE}$.

It will be appreciated that the user's ear 110 is simply representative of an audio output of the ANC headset 100 and physically a user's ear need not be present to model the ANC headset 100.

The transfer function of a signal path is representative of the gain and phase change of the signal path, as discussed previously. Defining the target transfer function $H_T$ comprises a step of determining the transfer functions $H_{AFF}$, $H_{AE}$, $H_{DE}$.

The transfer functions $H_{AFF}$, $H_{AE}$, $H_{DE}$ can be determined by making measurements and/or by deriving simulations results of the transfer functions of the relevant signal paths in an ANC headset. In mass production, the transfer functions $H_{AFF}$, $H_{AE}$, $H_{DE}$ can have minor variations between different samples of ANC headsets of the same acoustic design. Therefore, to provide the best data for each ANC headset, the transfer functions $H_{AFF}$, $H_{AE}$, $H_{DE}$ can be measured for each unit in a production line.

The transfer functions $H_{AFF}$, $H_{AE}$, $H_{DE}$ may be measured used a spectrum analyser. For measurement of the transfer functions $H_{AFF}$, $H_{AE}$, $H_{DE}$ the spectrum analyser may drive an input signal to the ambient noise source 108 or the speaker driver 106 and make a measurement of an output signal.

Alternatively, the transfer functions $H_{AFF}$, $H_{AE}$, $H_{DE}$ may be measured for a subset of the ANC headsets in production. This can provide transfer functions $H_{AFF}$, $H_{AE}$, $H_{DE}$ that are indicative of the transfer functions of all the units in the production line, thereby reducing measurement time prior to designing the feedforward filter. The measured data may also be supplemented using one or more reference unit measurements.

Measuring the transfer functions $H_{AFF}$, $H_{AE}$, $H_{DE}$ enables the algorithms provided by the methods of the present disclosure to take into account specific acoustic measurements to approximate the target transfer function $H_T$ that produces an optimum anti-noise signal from the speaker driver 106 to the user's ear 110.

With reference to the ANC system 100 and for FF operation, the following formula holds for optimum operation of ANC:

$$H_{AFF} \cdot H_{FF} \cdot H_{DE} + H_{AE} \rightarrow 0 \quad (4)$$

Solving equation (4) for the filter transfer function $H_{FF}$ yields the following:

$$H_{FF} \to -\frac{H_{AE}}{H_{AFF} \cdot H_{DE}} \quad (5)$$

Therefore, we may define the right hand side of equation (5) as the target transfer function $H_T$ such that:

$$H_T = -\frac{H_{AE}}{H_{AFF} \cdot H_{DE}} \quad (6)$$

and for optimum ANC operation:

$$H_{FF} \to H_T \quad (7)$$

Equation (6) defines the target transfer function $H_T$ as the negative of the transfer function of the first signal path ($H_{AE}$), divided by the dot product of the transfer function of the second signal path ($H_{AFF}$) and fourth signal paths ($H_{DE}$). The filter transfer function $H_{FF}$ of the feedforward filter for the feedforward microphone 102 should approximate the target transfer function $H_T$ as expressed by equation (6).

A measure of the ANC performance (FFANC) of the feedforward microphone 102 may be described by the following equation:

$$FFANC = \frac{H_{AE} + H_{AFF} \cdot H_{FF} \cdot H_{DE}}{H_{AE}} \quad (8)$$

It can be observed from equation (8) that FFANC tends to zero as the filter transfer function $H_{FF}$ tends to the target transfer function $H_T$.

In a further embodiment, the weighting vector W of equation (3) may be multiplied by a weighting factor. The weighting vector W may be multiplied by the weighting factor in a frequency range having a minimum frequency and a maximum frequency.

The weight factor may be applied in a frequency range over which it is desirable to apply ANC. Generally, higher weight values minimize the error function Err value in the least square method.

Figure 3:
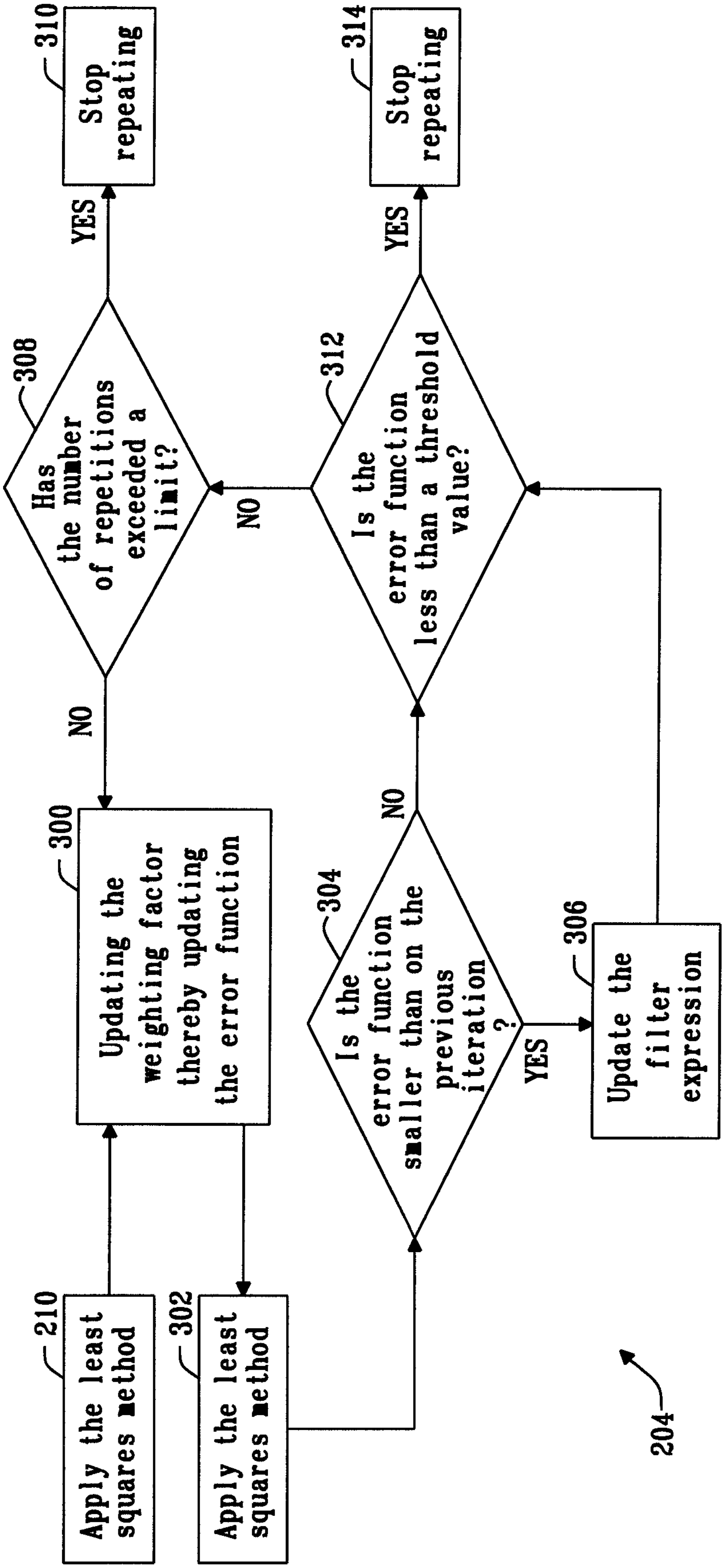
FIG. 3 is a flow chart showing additional steps of a step of the method as shown in FIG. 2B, in accordance with a third embodiment of the present disclosure.

FIG. 3 is a flow chart showing additional steps of the step 204 of the method 200 as shown in FIG. 2B, in accordance with a third embodiment of the present disclosure. Applying the least squares method, as shown in step 210, corresponds to step 210 as discussed previously.

In the present embodiment and after the step 210, the method 200 further comprises updating the weighting factor at a step 300. Updating of the weighting factor means that the error function Err will also be updated.

After step 300, the least squares method is applied using the error function Err to determine an alternative expression for the filter transfer function $H_{FF}$, at a step 302. At the step 302 the error function Err corresponds to the updated error function resulting from the step 300.

In the step 302, the alternative expression for the filter transfer function is an expression that reduces the error function Err to a sufficiently small value that is indicative of the filter transfer function $H_{FF}$ being sufficiently close to the target transfer function and/or minimizes the error function Err.

At a step 304, it is necessary to determine if the error function Err after application of the least square method at step 302 is smaller than prior to updating of the error function Err at the step 300. If the error function Err after updating is smaller, then the filter expression of the filter transfer function $H_{FF}$ is updated to the alternative expression at a step 306. Otherwise the filter expression remains unchanged.

The steps 300, 302, 304 (with the updating as provided by step 306 if required) is repeated until either one or both of the following conditions are met: the number of repetitions of the steps 300, 302, 304, (and 306 depending on the outcome of the step 304) exceeds a limit as indicated by steps 308 and 310, and/or the error function Err is less than a threshold value as indicated by steps 312 and 314.

Repetition of the steps 300, 302, 304 (with step 306 if required) acts to increase the approximation accuracy of the least square method by multiplying the weighting vector W with the weight factor that varies with each repetition. The weighting vector W may be multiplied by the weighting factor in a frequency range having a minimum frequency fmin and a maximum frequency fmax (for example, fmin≤f≤fmax, where f is a frequency within the frequency range). The method may act to iterate the values of the weight factor (wf) within a range such that wfmin≤wf≤wfmax, where wfmax is an upper limit of the weight factor range and wfmin is a lower limit of the weight factor range. The error function Err will be minimized when the weighting factor has a value that provides best performance of the ANC system and low overshoot level.

The weighting vector W may be equal to one divided by the magnitude of the target transfer function $H_T$ squared, as represented by the following equation:

$$W = \frac{1}{|H_T|^2} \quad (9)$$

The weighting vector W provided by equation (9) can act to minimize overshoots in ANC performance which can result in non-optimum ANC that can result in undesired ambient noise being audible to the user of the ANC headset implementing the system.

Equation (8) may be rewritten as follows:

$$H_{FF} \cdot H_{in} = H_{out} \quad (10)$$

where $$H_{in} = \frac{1}{H_T} \quad (11)$$

and $$H_{out} = \text{FFANC} - 1 \quad (12)$$

As shown by equations (2) and (3), the method 200 aims to minimize the error between an idealised transfer function profile (provided by the target transfer function $H_T$) and a mathematical expression describing a physically implementable transfer function (provided by the filter transfer function $H_{FF}$).

The target transfer function $H_T$ exhibits how gain and phase varies over frequency. A signal passing through a filter or similar (in this case the feedforward filter) having this transfer function will experience the gain and phase change characterised by the transfer function in providing the output signal.

An aim of the present disclosure is to provide the method 200 to design a feedforward filter that provides the idealised performance of the target transfer function $H_T$. This is achieved by finding the filter transfer function $H_{FF}$ that is represented by a mathematical expression that follows the gain and phase profile of the target transfer function $H_T$ within a suitable tolerance range represented by the error function Err.

Figure 4A:
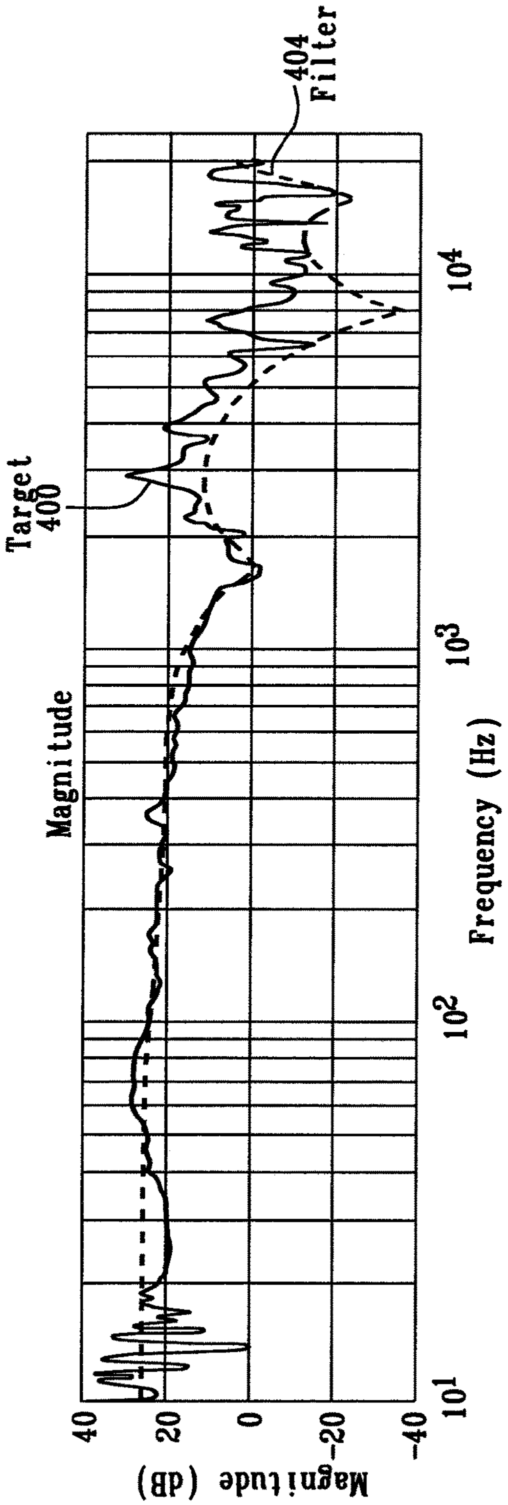
FIGS. 4A and 4B are graphs showing simulation results for a practical example of application of the method.
Figure 4B:
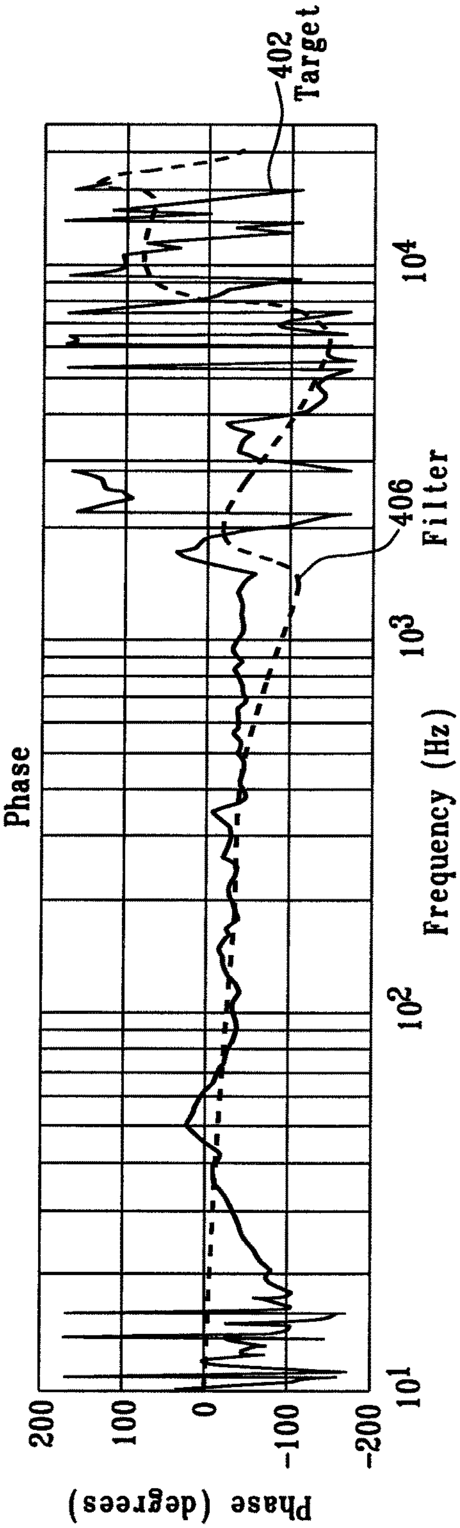

FIGS. 4A and 4B are graphs showing simulation results for a practical example of application of the method 200. A trace 400 shows the gain of the target transfer function $H_T$ and a trace 402 shows the phase of the target transfer function $H_T$ as each of the two parameters vary with frequency. A trace 404 shows the gain of the filter transfer function $H_{FF}$ and a trace 406 shows the phase of the filter transfer function $H_{FF}$ as each of the two parameters vary with frequency.

In the example presented in FIGS. 4A and 4B, the least square method has been applied to determine the filter expression for the filter transfer function $H_{FF}$ that acts to minimize the error function Err in accordance with equation (3). It can be observed in FIG. 4 that the filter transfer function $H_{FF}$ roughly follows the profile of the target transfer function $H_T$ for both gain and phase. Therefore implementation of the filter expression of the filter transfer function $H_{FF}$ in a physical implementation of a feedforward filter would provide gain and phase performance that is close to the target transfer function $H_T$, where the target transfer function $H_T$ describes the optimum performance for the feedforward filter as discussed previously. The mismatch between the traces 400, 404 and the traces 402, 406 is described by the error function Err.

Figure 5A:
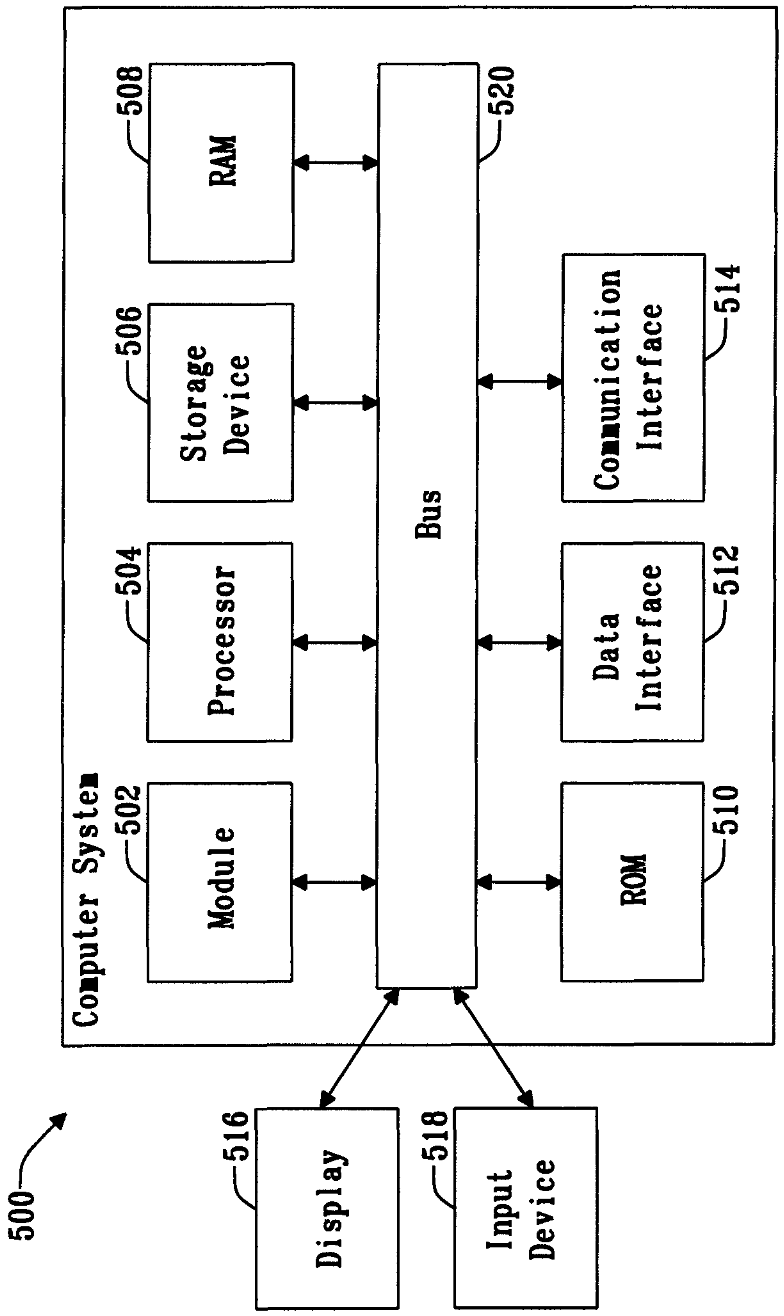
FIG. 5A is a schematic of a computer system which comprises specially modified components for carrying out the methods as disclosed herein, and in accordance with a fourth embodiment of the present disclosure.

FIG. 5A is a schematic of a computer system 500 which comprises specially modified components for carrying out the methods as disclosed herein, and in accordance with a fourth embodiment of the present disclosure. The computer system 500 comprises a module 502 configured as an automated feedforward filter design tool configured to design a feedforward filter for a system implementing active noise cancelling. The automated feedforward filter design tool may be configured to perform the method 200 and any of the specific embodiments related to the method 200 as described herein.

The computer system 500 may comprise a processor 504, a storage device 506, RAM 508, ROM 510, a data interface 512, a communications interface 514, a display 516, and an input device 518. The computer system 500 may comprise a bus 520 to enable communication between the different components.

The computer system 500 may be configured to load an application. The instructions provided by the application may be carried out by the processor 504. The application may be the automated feedforward filter design tool of the present disclosure.

A user may interact with the computer system 500 using the display 516 and the input device 518 to instruct the computer system 500 to implement the methods of the present disclosure in the automated design of a feedforward filter for an ANC system.

With reference to equation (3), the weighting vector W and the target transfer function $H_T$ may be defined automatically as part of the method 200, or may alternatively be provided as inputs, for example by a user interacting with the computer system 500. Determination of the filter transfer function $H_{FF}$ of the feedforward filter may be automated using the method 200.

Figure 5B:
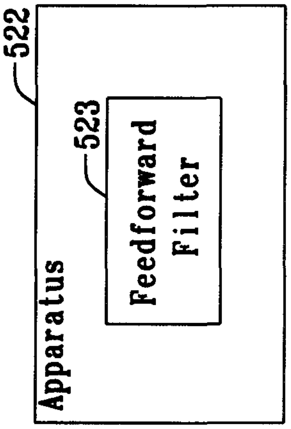
FIG. 5B is a schematic of an apparatus comprising a feedforward filter for a system implementing ANC, in accordance with a fifth embodiment of the present disclosure.

FIG. 5B is a schematic of an apparatus 522 comprising a feedforward filter 523 for a system implementing ANC, in accordance with a fifth embodiment of the present disclosure. The feedforward filter 523 may be designed using the method 200 and any of the specific embodiments related to the method 200 as described herein, and in accordance with the understanding of the skilled person. It will be appreciated that the feedforward filter 523 may comprise one or more sub-filters.

Figure 5C:
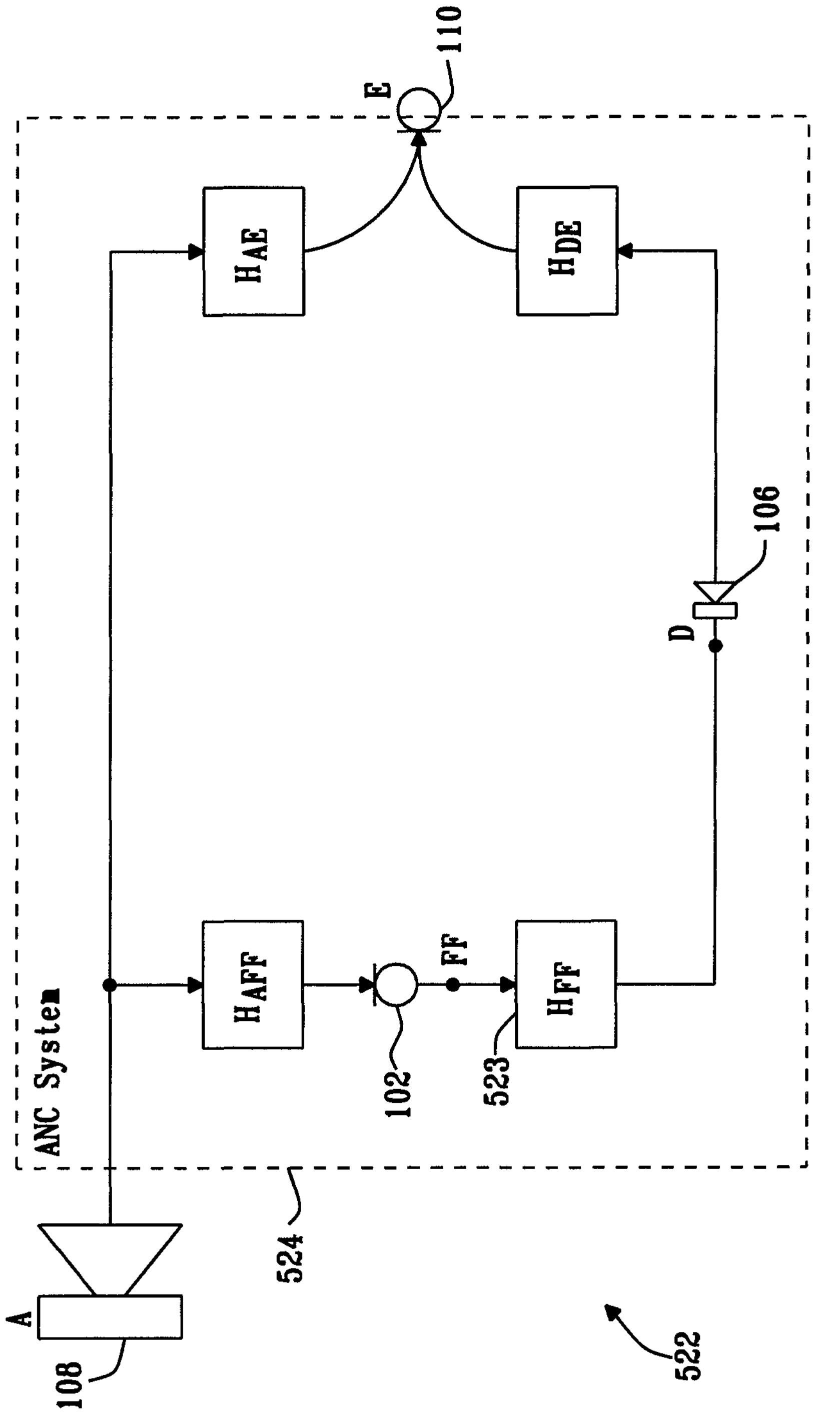
FIG. 5C is a schematic of a specific implementation of the apparatus of FIG. 5B in accordance with a sixth embodiment of the present disclosure.

FIG. 5C is a schematic of a specific implementation of the apparatus 522, where the apparatus 522 comprises an ANC system 524 comprising the feedforward filter 523 in accordance with a sixth embodiment of the present disclosure. The ANC system 524 is configured to provide feedforward ANC. The ANC system 524 shares features with the ANC system 100 and common features share common reference numerals and variables. The ANC system 524 is an example of a feedforward only ANC system.

Figure 5D:
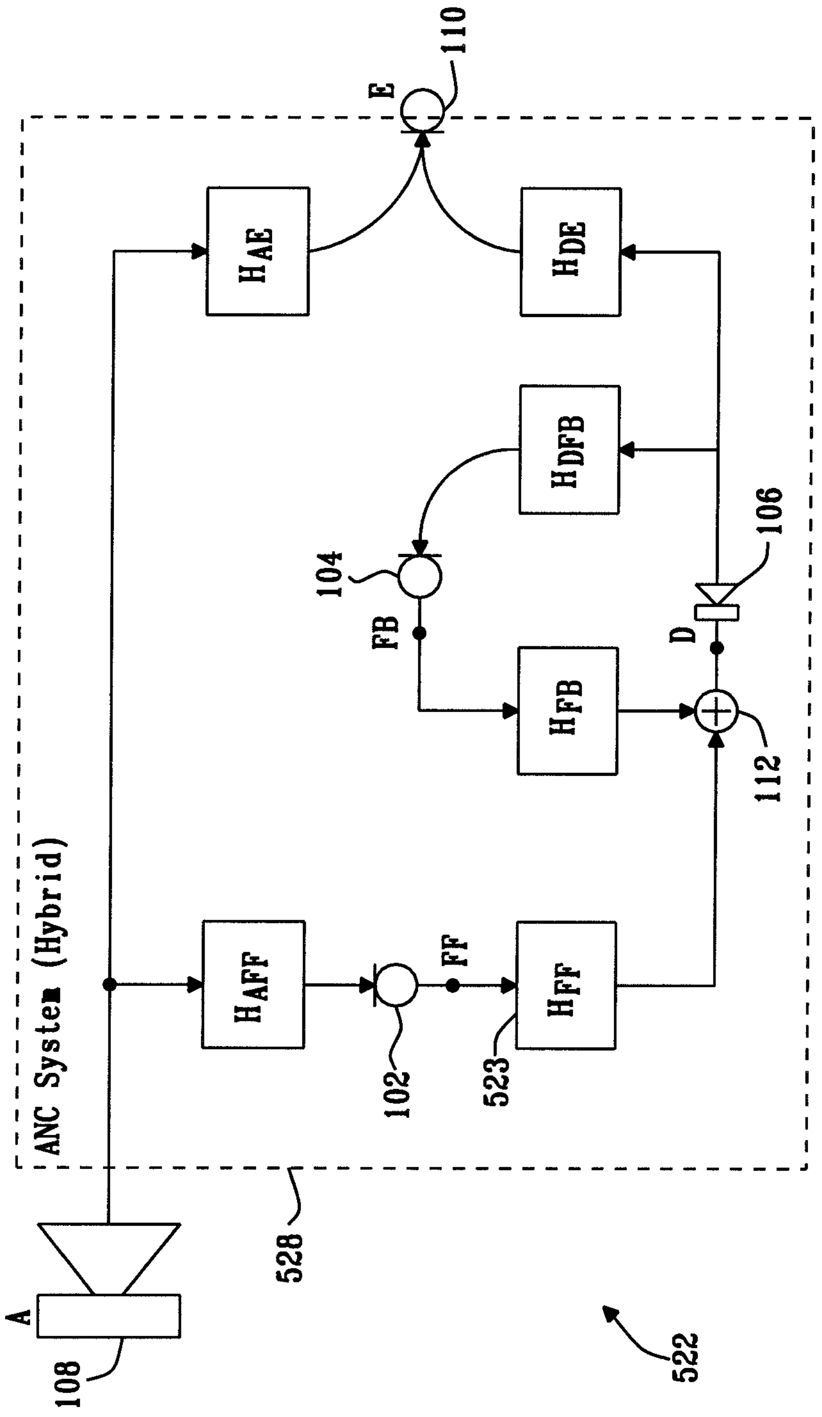
FIG. 5D is a schematic of another specific implementation of the apparatus of FIG. 5B in accordance with a seventh embodiment of the present disclosure.

FIG. 5D is a schematic of a specific implementation of the apparatus 522, where the apparatus 522 comprises an ANC system 528 comprising the feedforward filter 523 in accordance with a seventh embodiment of the present disclosure. The ANC system 528 is configured to provide feedforward ANC and feedback ANC and therefore the ANC system 528 is an example of a hybrid ANC system. The ANC system 528 shares features with the ANC system 100 and common features share common reference numerals and variables.

Figure 6:
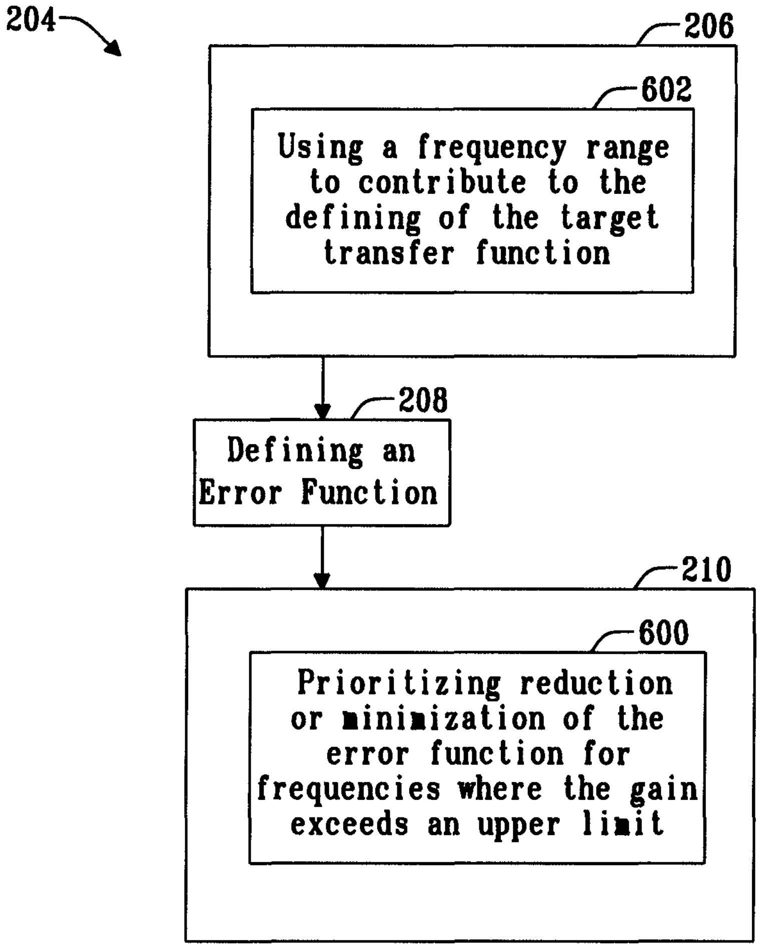
FIG. 6 is a flow chart of a specific implementation of a step of the method shown in FIG. 2A in accordance with an eighth embodiment of the present disclosure.

FIG. 6 is a flow chart of a specific implementation of the step 204 of the method 200 in accordance with an eighth embodiment of the present disclosure. Common reference numerals and variables between figures represents common features.

In the method 200 of the present embodiment, applying the least square method at the step 210 comprises prioritizing reduction or minimization of the error function for frequencies where the gain of the target transfer function $H_T$ exceeds an upper limit, at step 600.

The least squares algorithm preferably will prioritize the minimization of the error function Err at the frequency points of the target transfer function $H_T$ having the highest gain values because if these points are not approximated accurately in the filter transfer function $H_{FF}$ they will yield a large error function Err value.

There may be a large difference (for example 4 orders of magnitude or more) between a minimum and a maximum gain of the target transfer function $H_T$. By prioritizing the minimization of the error function Err at specific frequency points it is possible to minimize the error function Err in the desired frequency range more efficiently.

The method 200 in the present embodiment may be applied to design a feedforward filter for operation with a frequency range having a maximum frequency and a minimum frequency. This frequency range (in Hz) may be the frequency range over which ANC is desirable. The frequency range may be used to contribute to the defining of the target transfer function $H_T$ at the step 206, as represented by a step 602. The target transfer function $H_T$ may be used to define the ANC performance (FFANC) as represented by equation (8) and with reference to equation (6), which can be used to determine $H_{out}$ as shown by equation (12).

The weighting vector W may be defined using equation (9). The weighting vector W may be multiplied by the weight factor as discussed previously and as is illustrated in FIG. 3.

Figure 7:
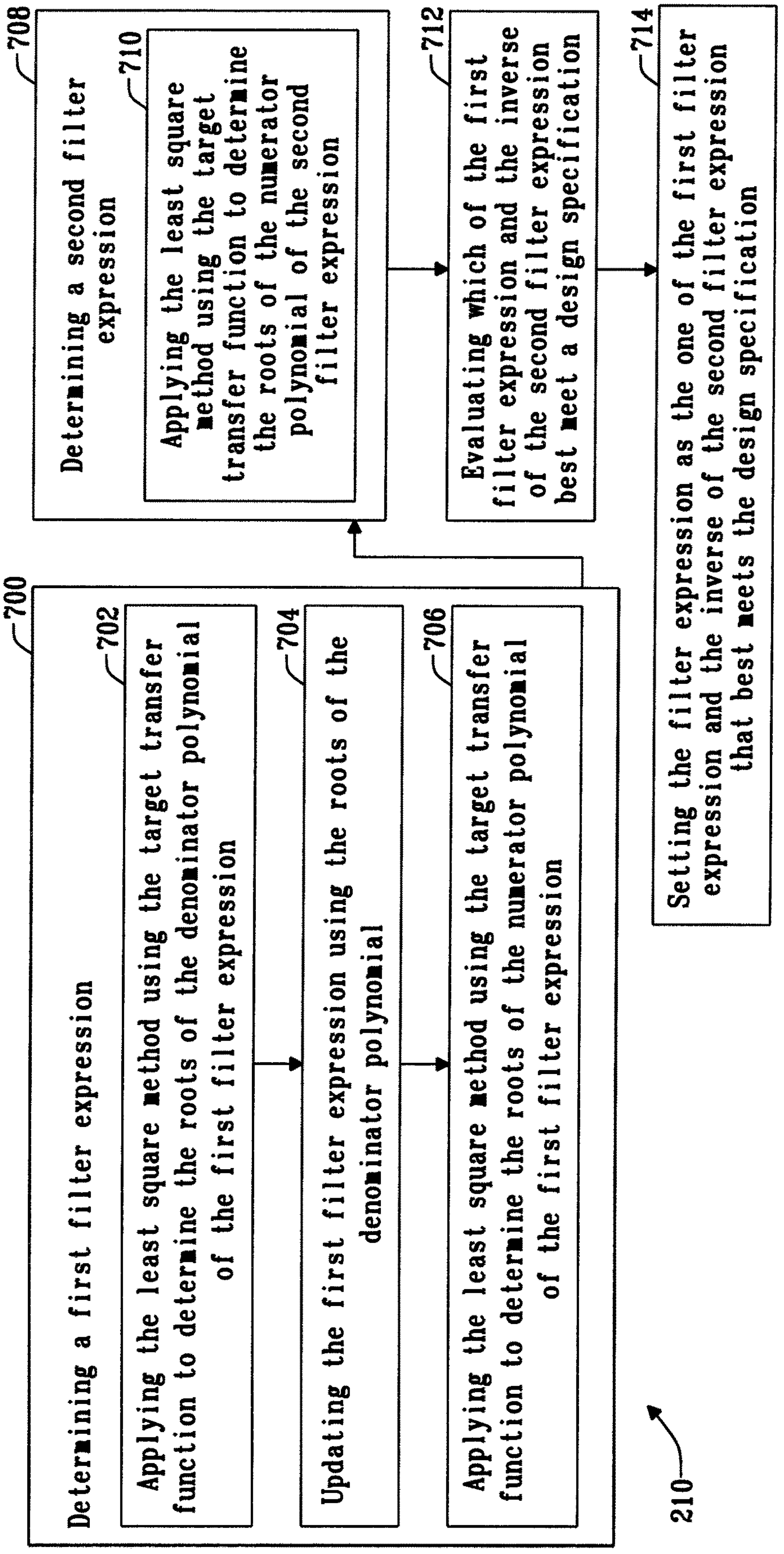
FIG. 7 is a schematic of a specific implementation of the method in accordance with a ninth embodiment of the present disclosure.

FIG. 7 is a schematic of a specific implementation of the method 200 in accordance with a ninth embodiment of the present disclosure. In particular, the present embodiment describes a specific implementation of the step 210 as shown in FIG. 2B. Common reference numerals and variables between figures represents common features.

Determining the filter transfer function $H_{FF}$ (the step 204) comprises defining a target transfer function $H_T$ of the feedforward filter (the step 206), as previously discussed.

For the step 210, determining a filter expression for the filter transfer function $H_{FF}$ comprises determining a first filter expression, at a step 700. The first filter expression comprises a numerator polynomial and a denominator polynomial. Expression (1) as previously discussed is an example of an expression having a numerator polynomial and a denominator polynomial. Determining first filter expression comprises applying the least square method using the target transfer function $H_T$ to determine the roots of the denominator polynomial of the first filter expression at a step 702. Determination of the roots of the denominator polynomial of the first filter expression may be performed in a warped frequency domain.

The step 702 may provide an initial estimate of filter pole positioning by splitting the poles in two groups, namely higher and lower frequency regions. This may be performed using the least square method in the warped frequency domain using different warping parameters for lower and higher frequencies. The low frequency range may align with the ANC operation frequency range and the high frequency range may align with a frequency range over which overshoots are expected to occur.

The warped frequency domain is a way to affect the spectral density of (change the resolution of) the frequency response points with a different factor in different ranges. This can yield different importance for the least square method in two ranges: the range with large compression will lead to less detail (higher error) in the least square method. This technique may imitate the human ear resolution.

The step 702 can provide optimized and detailed pole positioning allowing the least square approximation to calculate a filter transfer function $H_{FF}$ that is close to the target transfer function $H_T$ over a desired frequency range specified by the user. With this technique, the overshoot limit criterium specified for higher frequencies, can be also facilitated.

The pole positions may be split into two frequency ranges as follows:

$$1 \leq f \leq f_c \tag{13}$$

$$f_c < f \leq f_{last} \tag{14}$$

where $f_c$ is a central frequency that divides the two ranges, $f_{last}$ is a maximum frequency that the least square method will take into account and f is a frequency.

The number of poles depends on the order of the feedforward filter, which may be a user-defined parameter. Preferably, the number of poles in the ranges defined by equations (13) and (14) should total the feedforward filter order.

The number of poles in each of the ranges defined by equations (13) and (14) can be user defined or iterated by seeking the solution that gives the best results. This step may be substituted by any suitable method to calculate the initial complex pole values, including a user manual input of a pole set.

The following steps can be applied for each of the frequency ranges to determine the poles (the denominator polynomial of the filter transfer function $H_{FF}$):

1. Compute a warped angular frequency ω' using a normalized angular frequency of ω via the formula:

$$\omega\prime = \arctan\frac{(1-\lambda^2)\sin(\omega)}{(1+\lambda)^2\cos(\omega)-2\lambda} \tag{15}$$

where λ is a variable having a value between zero and one, with a higher value providing a larger spectral density and $$\omega = \frac{2\pi}{f_s} \tag{16}$$

where $f_s$ is a sampling frequency of the ANC system.

2. Defining $$H_{FF} = \frac{B}{A} \tag{17}$$

where B is the numerator polynomial and A is the denominator polynomial, as previously discussed.

3. Rewriting the error function Err of equation (3) as follows:

$$\text{Err} = \sqrt{W}|(H_{out}A - BH_{in})|^2 \tag{18}$$

or $$Err = \sqrt{W}\left|\left(H_{out} - \frac{B}{A}H_{in}\right)\right|^2 \tag{19}$$

where $H_{out}$ and $H_{in}$ are as provided by equations (12) and (11), respectively.

4. Applying the least square method to equations (18) or (19) to determine the roots of the denominator polynomial A, as described in the step 702, as follows:

$$\sqrt{W}|(H_{out}A - BH_{in})|^2 \rightarrow 0 \tag{20}$$

or $$\sqrt{W}\left|\left(H_{out} - \frac{B}{A}H_{in}\right)\right|^2 \rightarrow 0 \tag{21}$$

Determining the first filter expression may further comprise applying the least square method using the target transfer function $H_T$ to determine the roots of the numerator polynomial (for example, B as shown in equation (17) of the first filter expression, at the step 706, after the step 702. Determination of the roots of the numerator polynomial may be performed in a warped frequency domain.

The first filter expression may be updated using the roots of the denominator polynomial (for example, A as shown in equation (17)) of the first filter expression prior to the step 706, as shown by a step 704.

Once the roots of the A and B polynomials have been determined, it is possible to calculate the filter frequency response of the filter expression having the A and B polynomials using the coefficients of the polynomials. In the present example it is possible to determine the filter frequency response of the first filter expression. The ANC performance may be determined using equation (8).

The roots of a polynomial can be used to determine the coefficients of the polynomial and therefore can be used to determine a suitable filter expression for the filter transfer function $H_{FF}$.

Determining the filter expression may further comprise determining a second filter expression, at a step 708. The second filter expression takes the same format as the first filter expression and comprises numerator and denominator polynomials. The roots of the denominator polynomial of the second filter expression are equal to the roots of the numerator polynomial of the first filter expression as determined in the step 706. Determining the second filter expression comprises applying the least square method using the target transfer function $H_T$ to determine the roots of the numerator polynomial of the second filter expression, at a step 710. Determination of the roots and coefficients of the numerator and denominator polynomials of the second filter expression may be performed in a warped frequency domain.

Determining the second filter expression may also comprise inverting the target transfer function $H_T$ and $H_{out}$ of the error functions Err presented in equations (18) and (19) prior to undertaking the least square method.

Specifically, determining the second filter expression may comprise inverting $H_{in}$ and $H_{out}$ of the error functions Err presented in equations (18) and (19) prior to undertaking the least square method. In effect the second filter expression corresponds to the inverse of the filter transfer function $H_{FF}$ (which may be written as $1/H_{FF}$, which is equivalent to A/B), which is why the zeroes of the first filter expression (numerator polynomial roots) are used to define the poles of the second filter expression (denominator polynomial roots).

In a preferred embodiment the method comprises conducting system identification introducing a desired notch-type or other ANC curve. System identification refers to the determination of a filter transfer function $H_{FF}$ as provided by equation (10). This technique optimizes the ANC performance results due to the introduction of an ideal ANC performance curve in the least squares method.

If we use equation (12) for such an approximation, we could predefine the desired FFANC characteristics by using a notch type or other ANC curve. The least square method will define the best $H_{FF}$ to achieve these curves.

Determining the filter expression may further comprise evaluating which of the first filter expression and the inverse of the second filter expression best meet a design specification, at a step 712. The design specification may comprise adaptive noise cancelling performance, attenuation gain and/or overshoot characteristics. The overshoot characteristics may define an overshoot limit.

Determining the filter expression may comprise setting the filter expression as the one of the first filter expression and the inverse of the second filter expression that best meets the design specification, at a step 714.

Using the methods disclosed herein it is possible to design a feedforward filter that achieves target ANC performance without exceeding an overshoot limit. The overshoot limit is the maximum amplification of the external sound that it is desirable not to exceed when applying the filter transfer function $H_{FF}$ in a feedforward filter.

Figure 8:
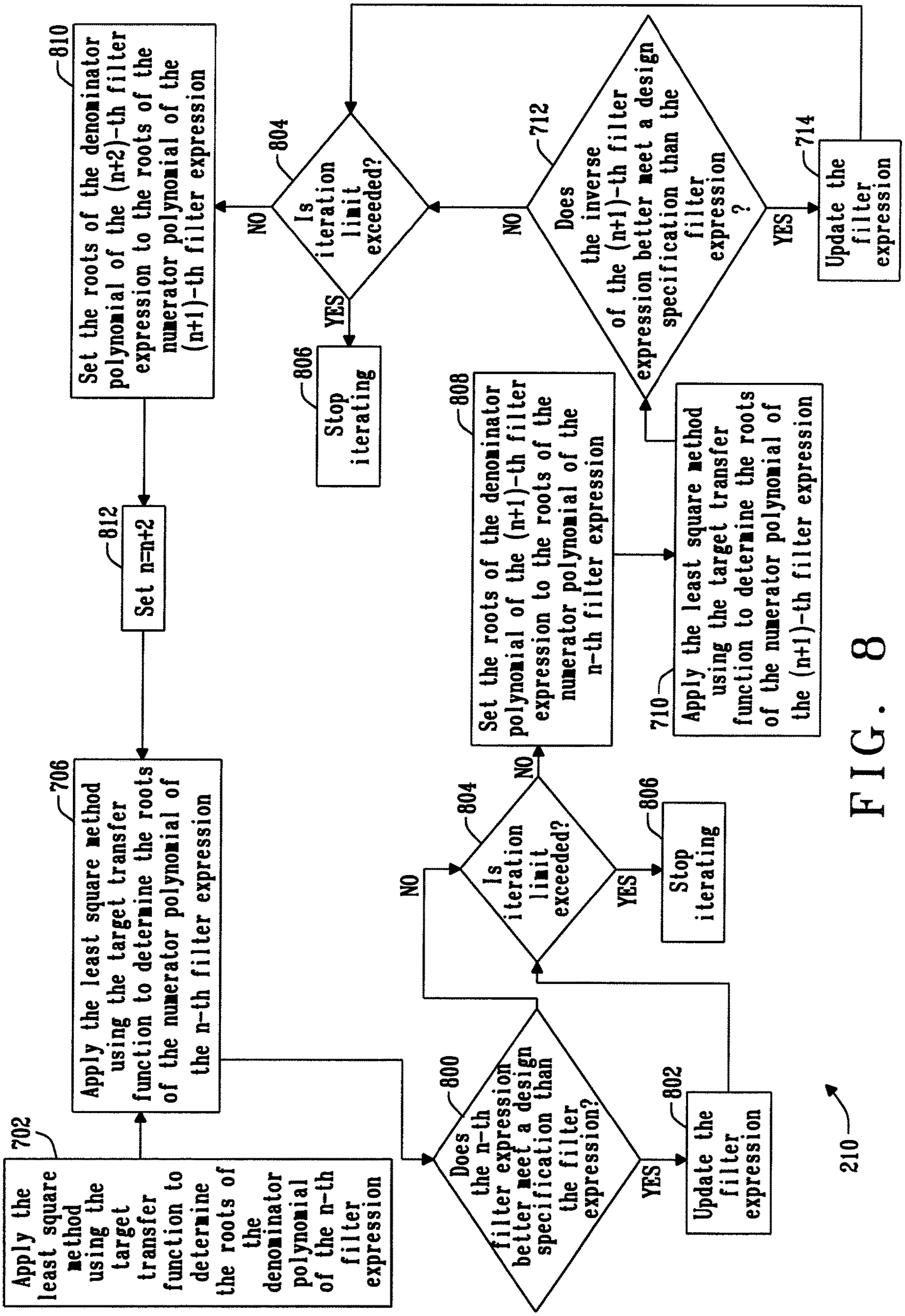
FIG. 8 is a flow chart of a specific embodiment of the method in accordance with a tenth embodiment of the present disclosure.

FIG. 8 is a flow chart of a specific embodiment of the method 200 in accordance with a tenth embodiment of the present disclosure. FIG. 8 shows how the steps outlined in FIG. 7 may be iterated. Common reference numerals and variables between figures represents common features. In the present example, the first expression has been relabelled the n-th filter expression and the second filter expression has been relabelled the (n+1)th filter expression. It will be appreciated that n is an integer that denotes the present number of iteration in the sequence. For example, initially n=1 and the procedure outlined in FIG. 7 is followed. It will be clear to the skilled person how the procedure of FIG. 7 is generalized to accommodate multiple iterations.

FIG. 8 shows an iterative approach for optimizing the poles and zeroes via approximation of the inverse frequency responses using zeroes as poles and searching for the solution that gives the best ANC performance.

An additional step is shown where the n-th filter expression is evaluated to see if it better matches the design specification that the present filter expression at a step 800. If so, the filter expression is updated to the n-th filter expression at step 802.

An iteration limit may be set, after which the iterative process can be halted. After each of the n filter expressions are evaluated, there may be a check to evaluate if the iteration limit is exceeded, at a step 804. The process can then be halted at a step 806 if the iteration limit is exceeded.

The roots of the denominator polynomial of the (n+1)-th filter expression are set to the roots of the numerator polynomial of the n-th filter expression at a step 808. This process is also carried out for the (n+1)-th and (n+2)-th filter expression at a step 810. The integer n is updated at a step 812, such that n=n+2.

If the filter transfer function $H_{FF}$ leads to an unsuitably high overshoot level, then it may be discarded through the iteration process at the step 800 and/or the step 712.

The procedures outlined in FIGS. 7 and 8 may be referred to as pole-zero optimization for the filter transfer function $H_{FF}$. With reference to FIG. 7, optimization is achieved with the initial calculation of a filter expression for the filter transfer function $H_{FF}$ as shown by step 700.

Then the calculated zeroes (the numerator roots of the first filter expression) are introduced into the algorithm as poles (denominator roots of the second filter expression). The target transfer function $H_T$ and the filter transfer function $H_{FF}$ are inversed and the least square method calculates the second filter expression at the step 710. The second filter expression is an inverse filter expression. The procedure may then be iterated as described in FIG. 8.

It will be appreciated that the processes described in FIGS. 7 and 8 have been shown for the step 210 but may also be applied for the step 302, in accordance with the understanding of the skilled person. Additionally, the application of the least square method at the steps 702, 704 and 710 may be a weighted least square method in accordance with the understanding of the skilled person and as described previously.

It will be appreciated that by implementing the iterative procedure of FIG. 8 as the step 302 of FIG. 3, the overall method will iterate multiple procedures. Specifically the procedure outlined in FIG. 3 will be iterated for a range of weighting factor values inside the ANC operation region, and the step 302, corresponding to FIG. 8 will also be iterated. Within each iteration process, the filter expression is updated if a better filter expression is calculated. This is specifically carried out at steps 306, 714 and 802. In summary, if the filter expression matches the criteria set by the user and/or is better performing than a previously calculated filter expression, the method updates the filter expression. The performance of the present filter expression can be determined by computing the filter frequency response and/or computing the ANC filter performance as discussed previously.

Figure 9:
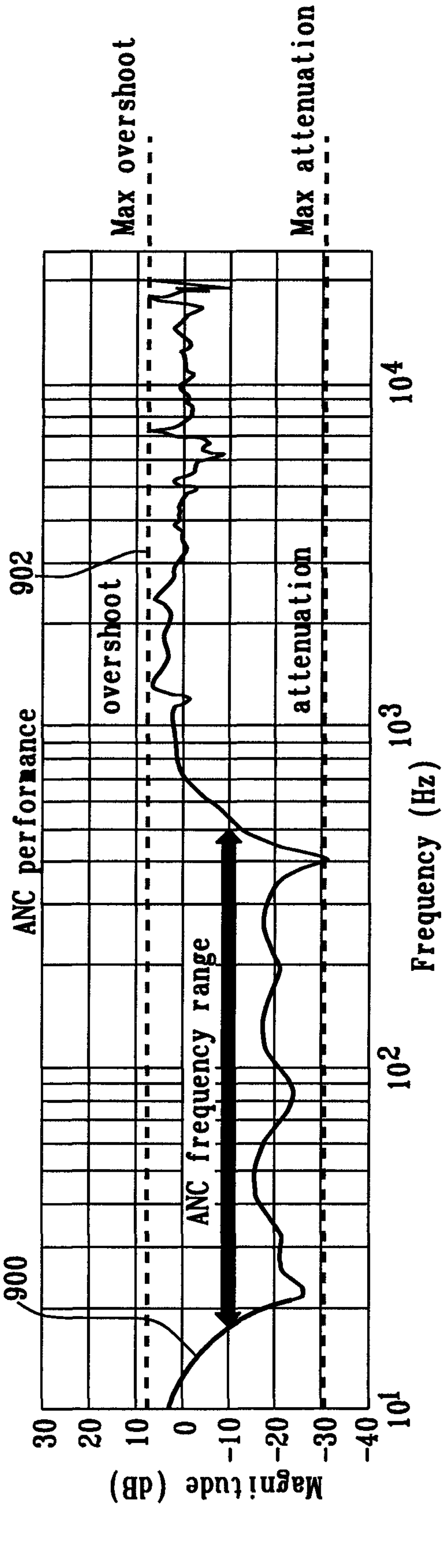
FIG. 9 is a graph showing an example of a magnitude attenuation curve over frequency for a feedforward filter.

FIG. 9 is a graph showing an example of a magnitude attenuation curve over frequency for a feedforward filter, shown by a trace 900. The magnitude attenuation curve over frequency for a feedforward filter can be estimated by equation (8) after the filter transfer function $H_{FF}$ has been defined by the algorithm. FIG. 9 may be indicative of a required ANC performance with overshoot characteristics and can be an example of a design specification as discussed previously. An overshoot limit 902 is labelled on the graph, which it is desirable that the gain of the filter transfer function $H_{FF}$ does not exceed in the present example.

Figure 10:
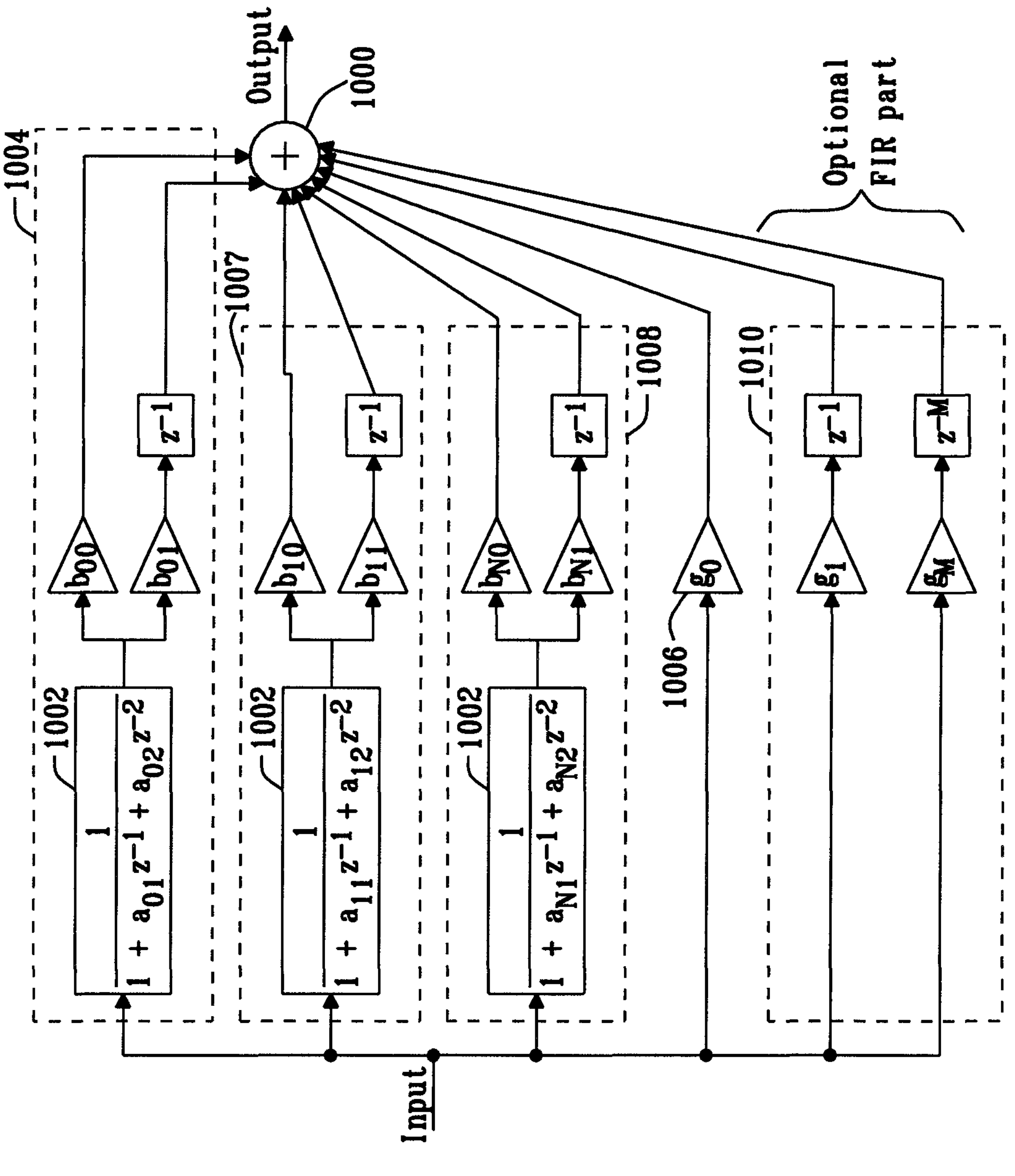
FIG. 10 is a block diagram of a filter transfer function as determined using the method disclosed herein.

FIG. 10 is a block diagram of a filter transfer function $H_{FF}$ as determined using the method disclosed herein. The block diagram illustrates how the coefficient approximation accuracy can be enhanced based on splitting the IIR filter transfer function in parallel biquadratic sections with fixed poles.

The feedforward filter having the filter transfer function $H_{FF}$ is broken down into parallel sections. The parallel sections are all added to determine the overall response of the feedforward filter at a point 1000.

A first series of blocks 1002 represents the denominator polynomial determined by the warped frequency method described previously for the step 702. $b_{00}$ and $b_{01}$ are the coefficients of the numerator polynomial as determined in the step 706 and are part of a first section 1004. The total number of available sections are related to the overall filter order that is required prior to running this method; an overall filter of Nth order will be broken down to N/2 sections. g0 is a flat gain added to the overall system (numeral 1006). If the order is an odd value, a first order section will be introduced.

Additional sections are labelled 1007 and 1008. $b_{10}$, $b_{11}$ are the coefficients of numerator polynomials of section 1007 and $b_{N0}$, $b_{N1}$ are coefficients of the numerator polynomials of section 1008. Reference numeral 1010 denotes an optional finite impulse response (FIR) part.

In a preferred embodiment the methods disclosed herein uses parallel structure Second Order Sections (SOS) to enhance accuracy and reduce error. The overall filter transfer function $H_{FF}$ can be derived by adding the individual sections as shown in FIG. 10. The reason to select this particular structure is that it enhances the calculation accuracy and reduces the least mean square error more effectively than the e.g. sequential biquad structure or defining the overall transfer function at once.

It will be appreciated that the parallel SOS can be converted to a sequential SOS (for example if required by the DSP architecture) using standard methodologies as will be clear to the skilled person.

Figure 11A:
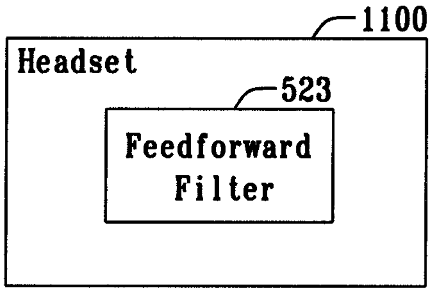
FIG. 11A is a schematic of a headset comprising a feedforward filter for a system implementing ANC, in accordance with a eleventh embodiment of the present disclosure.

FIG. 11A is a schematic of a headset 1100 comprising the feedforward filter 523 for a system implementing ANC, in accordance with a eleventh embodiment of the present disclosure. The feedforward filter 523 may be designed using the method 200 and any of the specific embodiments related to the method 200 as described herein, and in accordance with the understanding of the skilled person, as discussed previously. It will be appreciated that the feedforward filter 523 may comprise one or more sub-filters.

Figure 11B:
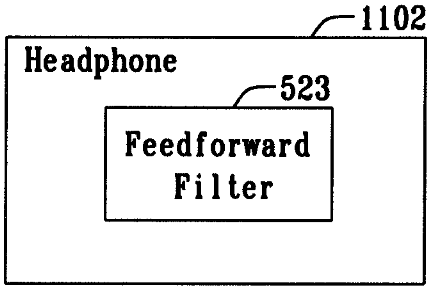
FIG. 11B is a schematic of a headphone comprising a feedforward filter for a system implementing ANC, in accordance with a twelfth embodiment of the present disclosure.

FIG. 11B is a schematic of a headphone 1102 comprising the feedforward filter 523 for a system implementing ANC, in accordance with a twelfth embodiment of the present disclosure. The feedforward filter 523 may be designed using the method 200 and any of the specific embodiments related to the method 200 as described herein, and in accordance with the understanding of the skilled person, as discussed previously. It will be appreciated that the feedforward filter 523 may comprise one or more sub-filters.

Figure 1B:
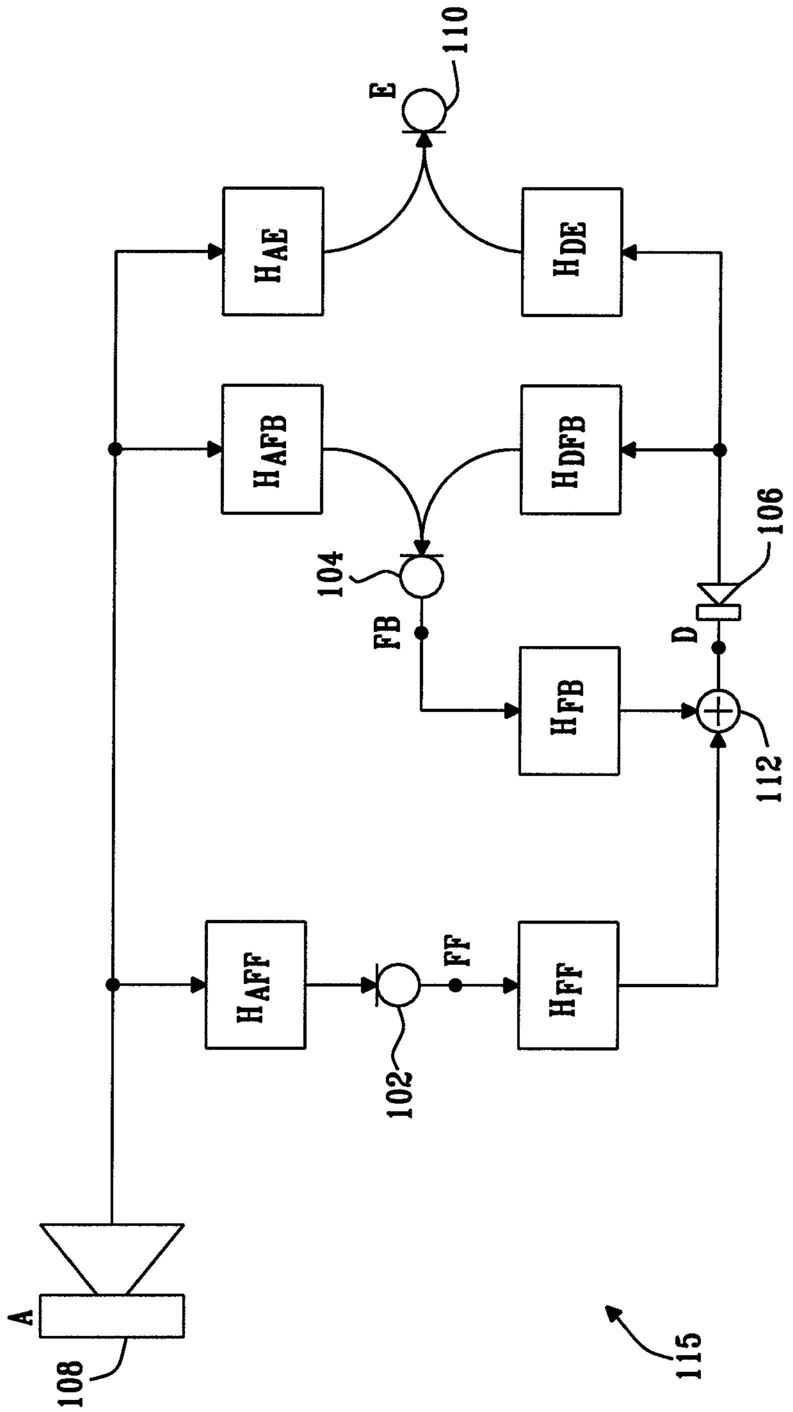
FIG. 1B Prior Art
FIG. 1B is an alternative schematic of the hybrid ANC headset of FIG. 1A.

In the case that a feedback filter exists in the system, the target transfer function $H_T$ may be modified for the feedforward filter design as follows. From FIG. 1B the following equations can be derived:

$$H_D = H_{AFF} \cdot H_{FF} + H_{AFB} \cdot H_{FB} + H_D \cdot H_{DFB} \cdot H_{FB} \tag{22}$$

$$H_D = \frac{H_{AFF} \cdot H_{FF} + H_{AFB} \cdot H_{FB}}{1 - H_{DFB} \cdot H_{FB}} \tag{23}$$

Thus the designed $H_{FF}$ is preferably designed so that:

$$H_D \cdot H_{DE} + H_{AE} \to 0 \tag{24}$$

Hence:

$$H_{FF} \to -\frac{H_{AE} \cdot (1 - H_{DFB} \cdot H_{FB}) - H_{AFB} \cdot H_{FB} \cdot H_{DE}}{H_{AFF} \cdot H_{DE}} \tag{25}$$

In this case:

$$H_T = -\frac{H_{AE} \cdot (1 - H_{DFB} \cdot H_{FB}) - H_{AFB} \cdot H_{FB} \cdot H_{DE}}{H_{AFF} \cdot H_{DE}} \tag{26}$$

The general principle of the methods disclosed herein, is that the minimizing the error function Err will provide the required ANC performance results. An ANC performance over the whole audible frequency range (20 Hz-20 kHz) exactly matching the target transfer function $H_T$ would require a significantly higher order compared to the typically limited ANC filter order. The filter order that is physically implementable may be dependent on the resources of the DSP.

Therefore, the methods disclosed herein allow the filter transfer function $H_{FF}$ to achieve both the error function minimization in the desired frequency range and to obtain specific characteristics in order to minimize overshoot level outside of it.

The methods of the present disclosure describe design algorithms for automatic FF ANC filter design and can provide an automated method for the design of FF filters for use in ANC headsets/headphones. The algorithms act to optimize the FF design procedure for ANC headsets/headphones.

Feedforward filters for an ANC system ideally have a tolerance of less than 1 dB in magnitude and less than 6 degrees in phase compared to the measured responses for calculating the target transfer function $H_T$ as described by equation (6). The errors represented by the tolerances are referring to the difference between the target transfer function $H_T$ and the filter transfer function $H_{FF}$. Moreover, the design engineer has a limited filter transfer function order available to adapt, due to resource limitation especially in IC design for obtaining lower processing cycles, power consumption, chip dimensions and cost.

The methods disclosed herein provide a means for fast and automatic design of the optimal infinite impulse response (IIR) transfer functions $H_{FF}$ for filtering audio signal captured by the feedforward microphone 102 to enable optimization of the external noise cancellation performance in both types of digital and analogue Active Noise Cancelling (ANC) headphones, namely FF only and hybrid (incorporating FF ANC and FB ANC). The algorithm sequence of the methods disclosed herein can calculate optimal FF IIR filter transfer function coefficients that may maximize the ANC performance.

The methods disclosed herein may be used to provide multiple "good candidates" for the FF filter design for an ANC system.

In mass production the use of the design methods disclosed herein could allow custom feedforward filter design on each separate ANC headphone unit. Typically, this cannot be achieved with current practice solutions where due to cost and time pressure, the feedforward filters are designed for a limited number of units and the best performing feedforward filters are applied in all the production units.

Various improvements and modifications may be made to the above without departing from the scope of the disclosure.

What is claimed is:

1. A computer-implemented method of designing a feedforward filter for an active noise cancelling system prior to physically implementing physical circuit components and parameters of the feedforward filter within the active noise cancelling system, the method comprising:

automatically determining, by a processor, a filter transfer function of the feedforward filter that is achievable using physical circuit components and parameters; wherein:

the filter transfer function is determined using a least square method;

the least square method is a weighted least square method such that the error function is dependent on a weighting vector; and determining the filter transfer function comprises:

defining a target transfer function of the feedforward filter;

defining an error function that is dependent on the target transfer function and the filter transfer function; and applying the least square method using the target transfer function to determine a filter expression for the filter transfer function by applying the least square method using the error function to determine the filter expression for the filter transfer function that either:

i) reduces the error function to a sufficiently small value that is indicative of the filter transfer function being sufficiently close to the target transfer function; and/or ii) minimizes the error function.

2. The method of claim 1, wherein the error function is dependent on the difference between the target transfer function and the filter transfer function.

3. The method of claim 1, wherein the error function is approximately equal to the magnitude squared of a first expression, the first expression being equal to the square root of the weighting vector multiplied by the difference between the filter transfer function and the target transfer function.

4. The method of claim 1, wherein the weighting vector is multiplied by a weighting factor.

5. The method of claim 1, comprising:

a) updating the weighting factor thereby updating the error function;

b) applying the least squares method using the error function to determine an alternative expression for the filter transfer function that either:

i) reduces the error function to a sufficiently small value that is indicative of the filter transfer function being sufficiently close to the target transfer function; and/or ii) minimizes the error function;

c) updating the filter expression to the alternative expression if the error function after updating is smaller than the error function prior to updating; and;

d) repeating the steps a) to c) until:

a number of repetitions of the steps a) to c) exceed a limit; and/or the error function is less than a threshold value.

6. The method of claim 4, wherein the weighting vector is multiplied by the weighting factor in a frequency range having a minimum frequency and a maximum frequency.

7. The method of claim 1, wherein the weighting vector is approximately equal to one divided by the magnitude of the target transfer function squared.

8. The method of claim 1, wherein, defining the target transfer function comprises:

i) modelling an active noise cancelling headset comprising:

a first signal path from an ambient noise source to a user's ear;

a second signal path from the ambient noise source to a feedforward microphone;

a third signal path from the feedforward microphone to a speaker driver; and a fourth signal path from the speaker driver to the user's ear;

ii) determining a transfer function of each of the first, second and fourth signal paths, wherein the transfer function of a signal path represents a gain and a phase change of the signal path;

iii) defining the target transfer function as the negative of the transfer function of the first signal path, divided by the dot product of the transfer function of the second and fourth signal paths.

9. The method of claim 8, wherein the transfer function of the third signal path is the filter transfer function to be determined.

10. The method of claim 8, wherein determining the transfer function of each of the first, second and fourth signal paths, comprises measuring the transfer functions and/or by deriving simulation results.

11. The method of claim 1, wherein the feedforward filter is designed within a frequency range having a maximum frequency and a minimum frequency.

12. The method of claim 1, wherein:

the target transfer function comprises a gain that is dependent on frequency; and applying the least square method comprises prioritizing reduction or minimization of the error function for frequencies where the gain exceeds an upper limit.

13. A computer system comprising:

a module configured as an automated feedforward filter design tool configured to design a feedforward filter for an active noise cancelling system prior to physically implementing physical circuit components and parameters of the feedforward filter within the active noise cancelling system by automatically determining, by a processor, a filter transfer function of the feedforward filter that is achievable using physical circuit components and parameters wherein:

the filter transfer function is determined using a least square method;

the least square method is a weighted least square method such that the error function is dependent on a weighting vector; and determining the filter transfer function comprises:

defining a target transfer function of the feedforward filter defining an error function that is dependent on the target transfer function and the filter transfer function; and applying the least square method using the target transfer function to determine a filter expression for the filter transfer function by applying the least square method using the error function to determine the filter expression for the filter transfer function that either:

i) reduces the error function to a sufficiently small value that is indicative of the filter transfer function being sufficiently close to the target transfer function; and/or ii) minimizes the error function.

* * * * *